United States Patent
Breed

(10) Patent No.: US 7,604,080 B2
(45) Date of Patent: Oct. 20, 2009

(54) REAR IMPACT OCCUPANT PROTECTION APPARATUS AND METHOD

(75) Inventor: David S. Breed, Boonton Township, NJ (US)

(73) Assignee: Automotive Technologies International, Inc., Denville, NJ (US)

(*) Notice: Subject to any disclaimer, the term of this patent is extended or adjusted under 35 U.S.C. 154(b) by 242 days.

(21) Appl. No.: 11/381,001

(22) Filed: May 1, 2006

(65) Prior Publication Data

US 2006/0186713 A1 Aug. 24, 2006

Related U.S. Application Data

(60) Division of application No. 10/733,957, filed on Dec. 11, 2003, now Pat. No. 7,243,945, which is a continuation-in-part of application No. 10/234,063, filed on Sep. 3, 2002, now Pat. No. 6,746,078, which is a continuation-in-part of application No. 09/613,925, filed on Jul. 11, 2000, now Pat. No. 6,805,404, which is a continuation-in-part of application No. 08/992,525, filed on Dec. 17, 1997, now Pat. No. 6,088,640.

(51) Int. Cl.
*B60N 2/427* (2006.01)

(52) U.S. Cl. .................. 180/274; 297/216.14; 180/282

(58) Field of Classification Search ............ 297/216.12, 297/216.1, 216.13, 216.14, 216.15; 180/271, 180/282, 274; 296/68.1; 342/72
See application file for complete search history.

(56) References Cited

U.S. PATENT DOCUMENTS

| | | | |
|---|---|---|---|
| 3,275,975 A | | 9/1966 | King |
| 3,420,572 A | * | 1/1969 | Bisland ........... 180/271 |
| 3,655,217 A | | 4/1972 | Johnson |
| 3,680,912 A | | 8/1972 | Matsuura |
| 3,770,315 A | | 11/1973 | Smittle et al. |

(Continued)

FOREIGN PATENT DOCUMENTS

GB 2289786 11/1995

(Continued)

OTHER PUBLICATIONS

Marcy Edwards et al., "Improved Seat and Head Restraint Evaluations", SAE Paper No. 05-0374, Jan. 1, 2005, US.

(Continued)

*Primary Examiner*—Paul N Dickson
*Assistant Examiner*—Karen Jane Amores
(74) *Attorney, Agent, or Firm*—Brian Roffe

(57) ABSTRACT

Vehicle including a system for preventing injury to an occupant's head and neck during a rear impact includes a support structure for supporting the occupant including an upper body support portion for supporting the occupant's head and neck, the support structure having a plurality of different positions selectable by the occupant, and a positioning system for adjusting the position of the support structure prior to the rear impact such that the upper body support portion is closer to and preferably in contact with the occupant's head and neck during the rear impact. As a result, motion of the occupant's head and neck relative to the occupant's back is thereby reduced and preferably eliminated during the rear impact. Whiplash injuries are therefore reduced if not eliminated using the invention.

37 Claims, 14 Drawing Sheets

U.S. PATENT DOCUMENTS

| | | | |
|---|---|---|---|
| 3,838,870 A * | 10/1974 | Hug | 297/472 |
| 4,519,652 A | 5/1985 | Kamijo | |
| 4,645,233 A * | 2/1987 | Bruse et al. | 280/801.2 |
| 4,744,601 A | 5/1988 | Nakanishi | |
| 4,797,824 A | 1/1989 | Sugiyama et al. | |
| 4,811,226 A | 3/1989 | Shinohara | |
| 4,853,687 A | 8/1989 | Isomura et al. | |
| 4,865,388 A | 9/1989 | Nemoto | |
| 4,935,680 A | 6/1990 | Sugiyama | |
| 4,995,639 A | 2/1991 | Breed | |
| 5,003,240 A | 3/1991 | Ikeda | |
| 5,006,771 A * | 4/1991 | Ogasawara | 318/568.1 |
| 5,008,946 A | 4/1991 | Ando | |
| 5,071,160 A | 12/1991 | White et al. | |
| 5,074,583 A | 12/1991 | Fujita et al. | |
| 5,095,257 A * | 3/1992 | Ikeda et al. | 318/568.1 |
| 5,151,944 A | 9/1992 | Yamamura | |
| 5,161,820 A | 11/1992 | Vollmer | |
| 5,181,763 A | 1/1993 | Dellanno et al. | |
| 5,205,585 A | 4/1993 | Reuber et al. | |
| 5,290,091 A * | 3/1994 | Dellanno et al. | 297/391 |
| 5,330,226 A | 7/1994 | Gentry et al. | |
| 5,364,164 A * | 11/1994 | Kuranami | 297/408 |
| 5,377,108 A * | 12/1994 | Nishio | 701/45 |
| 5,378,043 A | 1/1995 | Viano et al. | |
| 5,466,001 A * | 11/1995 | Gotomyo et al. | 280/730.1 |
| 5,484,189 A | 1/1996 | Patterson | |
| 5,502,432 A * | 3/1996 | Ohmamyuda et al. | 340/436 |
| 5,580,124 A * | 12/1996 | Dellanno | 297/216.12 |
| 5,684,701 A * | 11/1997 | Breed | 701/45 |
| 5,694,320 A * | 12/1997 | Breed | 701/45 |
| 5,732,785 A * | 3/1998 | Ran et al. | 180/271 |
| 5,748,473 A | 5/1998 | Breed et al. | |
| 5,767,766 A * | 6/1998 | Kwun | 340/436 |
| 5,769,489 A | 6/1998 | Dellanno | |
| 5,785,347 A * | 7/1998 | Adolph et al. | 280/735 |
| 5,795,019 A | 8/1998 | Wieclawski | |
| 5,820,211 A * | 10/1998 | Heilig et al. | 297/216.12 |
| 5,822,707 A * | 10/1998 | Breed et al. | 701/49 |
| 5,829,782 A * | 11/1998 | Breed et al. | 280/735 |
| 5,833,312 A * | 11/1998 | Lenz | 297/216.13 |
| 5,836,647 A | 11/1998 | Turman | |
| 5,836,648 A * | 11/1998 | Karschin et al. | 297/216.14 |
| 5,842,738 A * | 12/1998 | Knoll et al. | 297/216.12 |
| 5,848,661 A * | 12/1998 | Fu | 180/273 |
| 5,882,071 A * | 3/1999 | Fohl | 297/216.12 |
| 5,911,433 A | 6/1999 | Swann | |
| 5,927,804 A * | 7/1999 | Cuevas | 297/216.12 |
| 5,934,750 A * | 8/1999 | Fohl | 297/216.12 |
| 5,961,182 A * | 10/1999 | Dellanno | 297/216.12 |
| 6,017,086 A * | 1/2000 | Meyer et al. | 297/216.12 |
| 6,022,074 A | 2/2000 | Swedenklef | |
| 6,030,036 A * | 2/2000 | Fohl | 297/216.14 |
| 6,031,484 A * | 2/2000 | Bullinger et al. | 342/72 |
| 6,033,018 A * | 3/2000 | Fohl | 297/216.13 |
| 6,042,145 A * | 3/2000 | Mitschelen et al. | 280/735 |
| 6,082,817 A | 7/2000 | Muller | |
| 6,088,640 A * | 7/2000 | Breed | 701/45 |
| 6,135,561 A * | 10/2000 | Kruger et al. | 297/408 |
| 6,158,812 A * | 12/2000 | Bonke | 297/391 |
| 6,176,543 B1 * | 1/2001 | Nawata et al. | 296/68.1 |
| 6,196,579 B1 | 3/2001 | Bowers et al. | |
| 6,199,900 B1 | 3/2001 | Zeigler | |
| 6,199,947 B1 * | 3/2001 | Wiklund | 297/216.12 |
| 6,213,548 B1 | 4/2001 | Van Wynsberghe et al. | |
| 6,296,306 B1 * | 10/2001 | Specht et al. | 297/216.14 |
| 6,331,014 B1 | 12/2001 | Breed | |
| 6,352,285 B1 | 3/2002 | Schulte et al. | |
| 6,478,373 B1 | 11/2002 | Hake et al. | |
| 6,607,242 B2 | 8/2003 | Estrada et al. | |
| 6,715,829 B2 | 4/2004 | Svantesson et al. | |
| 6,746,078 B2 * | 6/2004 | Breed | 297/216.12 |
| 6,805,404 B1 | 10/2004 | Breed | |
| 6,820,930 B2 | 11/2004 | Dellanno | |
| 6,863,343 B2 | 3/2005 | Pal et al. | |
| 7,185,950 B2 * | 3/2007 | Pettersson et al. | 297/216.12 |
| 7,243,945 B2 * | 7/2007 | Breed et al. | 280/735 |
| 2004/0195872 A1 * | 10/2004 | Svantesson | 297/216.12 |
| 2004/0195894 A1 * | 10/2004 | Pal et al. | 297/406 |
| 2004/0239160 A1 * | 12/2004 | Thunnissen et al. | 297/216.12 |
| 2004/0245814 A1 * | 12/2004 | Lee | 297/216.12 |
| 2004/0245833 A1 * | 12/2004 | Svantesson | 297/408 |
| 2005/0264052 A1 | 12/2005 | Dellanno | |

FOREIGN PATENT DOCUMENTS

| | | |
|---|---|---|
| GB | 2301906 | 12/1996 |
| WO | WO 94/22693 | 10/1994 |
| WO | WO 96/28318 A1 * | 9/1996 |

OTHER PUBLICATIONS

David C. Viano et al., "Headrest Position During Normal Driving", Accid. Anal. And prev., vol. 28, No. 6, pp. 665-674, Nov. 20, 1995, UK.

"Grammer Active Head Restraints at 2005 SAE—Infringement", Apr. 11, 2005, Troy, MI.

\* cited by examiner

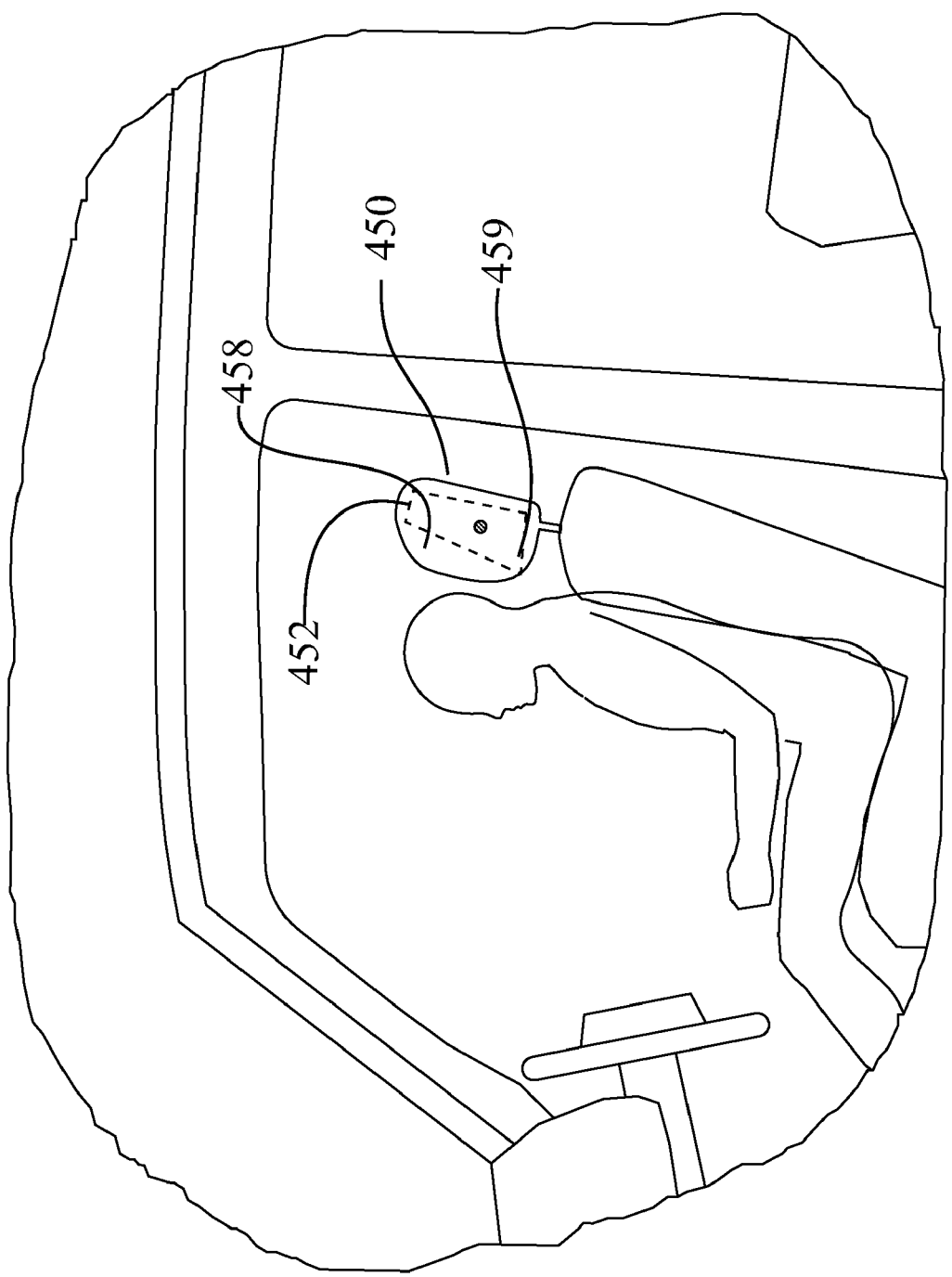

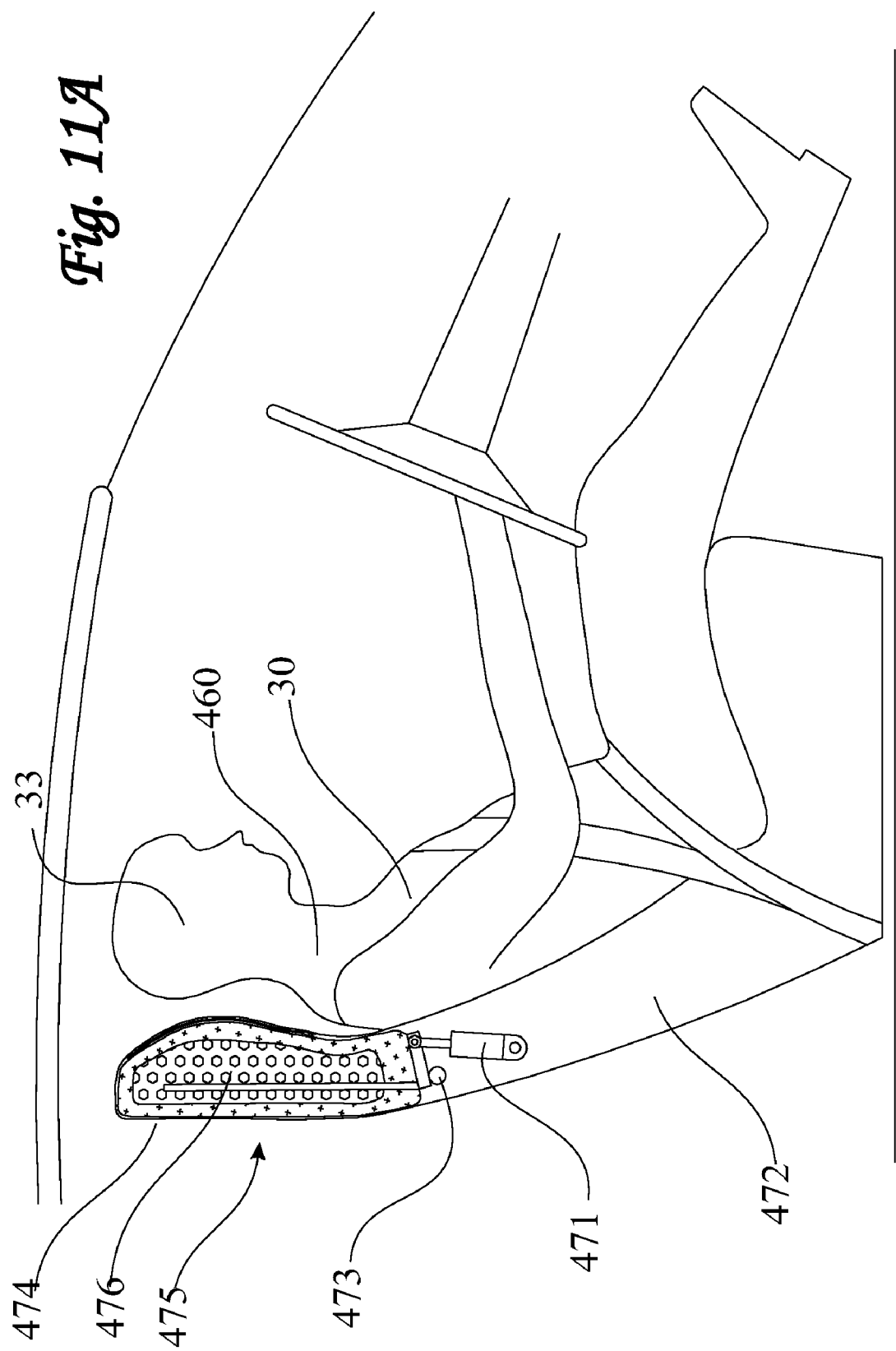

REAR IMPACT OCCUPANT PROTECTION APPARATUS AND METHOD

CROSS REFERENCE TO RELATED APPLICATIONS

This application is a divisional of U.S. patent application Ser. No. 10/733,957 filed Dec. 11, 2003, now U.S. Pat. No. 7,243,945, which is:

1. a continuation-in-part (CIP) of U.S. patent application Ser. No. 10/234,063 filed Sep. 3, 2002, now U.S. Pat. No. 6,746,078, which is a CIP of U.S. patent application Ser. No. 09/613,925 filed Jul. 11, 2000, now U.S. Pat. No. 6,805,404, which is a CIP of U.S. patent application Ser. No. 08/992,525, filed Dec. 17, 1997, now U.S. Pat. No. 6,088,640; and 2. a CIP of U.S. patent application Ser. No. 09/613,925 filed Jul. 11, 2000, now U.S. Pat. No. 6,805,404, which is a CIP of U.S. patent application Ser. No. 08/992,525, filed Dec. 17, 1997, now U.S. Pat. No. 6,088,640.

This application is related to U.S. Pat. No. 5,694,320 and U.S. patent application Ser. No. 10/895,121 filed Jul. 21, 2004, now U.S. Pat. No. 7,407,029, on the grounds that they include common subject matter.

FIELD OF THE INVENTION

The present invention relates generally to systems and methods for adjusting a support structure in a vehicle which supports an occupant prior to a rear impact to protect the occupant's head and/or neck during the rear impact and more particularly to systems and methods for adjusting a headrest in the vehicle which supports the occupant's head and/or neck prior to the rear impact to protect the occupant's head and/or neck from whiplash injury during the rear impact.

BACKGROUND OF THE INVENTION

A detailed background of the invention is found in the parent application, U.S. patent application Ser. No. 10/733, 957, incorporated by reference herein. Section 14.10 is particularly relevant to the present invention.

The definitions set forth in section 15 of the Background of the Invention section of the '957 application are also incorporated by reference herein.

All of the patents, patent applications, technical papers and other references referenced in the '957 application and herein are incorporated herein by reference in their entirety.

OBJECTS and SUMMARY OF THE INVENTION

It is an object of this invention to determine the position of the rear of an occupant's head and to use that information to control the position of the headrest.

It is another object of the present invention to provide new and improved headrests for seats in a vehicle which offer protection for an occupant in the event of a crash involving the vehicle.

It is another object of the present invention to provide new and improved seats for vehicles which offer protection for an occupant in the event of a crash involving the vehicle.

It is still another object of the present invention to provide new and improved cushioning arrangements for vehicles and protection systems including cushioning arrangements which provide protection for occupants in the event of a crash involving the vehicle and/or in the event of a collision into the rear of the vehicle, i.e., a rear impact.

It is yet another object of the present invention to provide new and improved vehicular systems which reduce whiplash injuries from rear impacts of a vehicle by causing the headrest to be automatically positioned proximate to the occupant's head.

It is yet another object of the present invention to provide new and improved vehicular systems to position a headrest proximate to the head of a vehicle occupant prior to a pending impact into the rear of a vehicle.

It is yet another object of the present invention to provide a method and arrangement for protecting an occupant in a vehicle during a crash involving the vehicle using an anticipatory sensor system and a cushioning arrangement including a fluid-containing bag which is brought closer toward the occupant or ideally in contact with the occupant prior to or coincident with the crash. The bag would then conform to the portion of the occupant with which it is in contact.

It is yet another object of the present invention to provide an automatically adjusting system which conforms to the head and neck geometry of an occupant regardless of the occupant's particular morphology to properly support both the head and neck.

In order to achieve at least one of the immediately foregoing objects, a vehicle including a system for preventing injury to an occupant's head and neck during a rear impact in accordance with the invention includes a support structure for supporting the occupant including an upper body support portion for supporting the occupant's head and neck, the support structure having a plurality of different positions selectable by the occupant, and a positioning system for adjusting the position of the support structure prior to the rear impact such that the upper body support portion is closer to and preferably in contact with the occupant's head and neck during the rear impact. As a result, motion of the occupant's head and neck relative to the occupant's back is thereby reduced and preferably eliminated during the rear impact. Whiplash injuries are therefore reduced if not eliminated using the invention.

A position determining system may be provided on the vehicle, e.g., in the seat, for determining the position of the occupant's head and/or neck. As such, the positioning system may be designed to adjust the position of the support structure based on the determined position of the occupant's head and/or neck.

The support structure may comprise a seat having a seat back portion wherein the upper body support portion is or comprises a headrest movable relative to the seat back portion. The headrest may be resettable, i.e., reusable, because it does not undergo permanent damage during the rear impact.

The upper body support portion may be arranged to simultaneously support both the occupant's head and neck.

A crash sensor detects or predicts (i.e., an anticipatory crash sensor) the rear impact and a control module may be coupled to the crash sensor and the positioning system and arranged to control the positioning system to adjust the position of the support structure upon a detection or prediction of the rear impact by the crash sensor.

The positioning system is activatable to move the support structure or part thereof closer to and preferably into contact with the occupant's head and neck during the rear impact.

Another embodiment of a vehicle including a system for preventing injury to an occupant's head and neck during a rear impact in accordance with the invention includes a support structure as described above and a positioning system for adjusting the position of the support structure from a first position in which the upper body support portion is apart from the occupant's head and neck to a second position in which the upper body support portion is closer to and preferably in contact with the occupant's head and neck. The positioning system is activated, e.g., by the control module described above, to adjust the support structure prior to the rear impact. The variations described above are applicable in this embodiment as well.

A method for preventing injury to a vehicular occupant's head and neck during a rear impact involving the vehicle in accordance with the invention comprises enabling the occupant to selectively adjust a support structure which is designed to support the occupant's head and neck into one of a plurality of different positions, detecting or predicting the rear impact, determining that the occupant's head and/or neck require support for the rear impact, and adjusting the position of the support structure prior to the rear impact such that an upper body support portion of the support structure is closer to and preferably in contact with the occupant's head and neck during the rear impact. Motion of the occupant's head and neck relative to the occupant's back is thereby reduced and preferably eliminated during the rear impact.

Optionally, the position of the occupant's head and/or neck is determined prior to the rear impact, so that the position of the support structure is adjusted based on the determined position of the occupant's head and/or neck. Adjustment of the support structure may entail moving the support structure from a first position in which the upper body support portion is apart from the occupant's head and neck to a second position in which the upper body support portion is closer to and preferably in contact with the occupant's head and neck. Advantageously, by constructing the upper body support portion to prevent permanent damage thereto during the rear impact, it can be moved back to the first position after the rear impact.

Other objects and advantages of the present invention will become apparent from the following description of the preferred embodiments taken in conjunction with the accompanying drawings. Also, objects of other inventions disclosed herein are set forth in the '881 application.

BRIEF DESCRIPTION OF THE DRAWINGS

The following drawings are illustrative of embodiments of the system developed or adapted using the teachings of this invention and are not meant to limit the scope of the invention as encompassed by the claims. In particular, the illustrations below are frequently limited to the monitoring of the front passenger seat for the purpose of describing the system. Naturally, the invention applies as well to adapting the system to the other seating positions in the vehicle and particularly to the driver and rear passenger positions.

FIG. 9A is a side view of an occupant seated in the driver seat of an automobile with the headrest in the normal position.

FIG. 11A is a side view of an occupant seated in the driver seat of an automobile having an integral seat and a pivotable headrest and bladder with the headrest in the normal position.

DETAILED DESCRIPTION OF THE PREFERRED EMBODIMENTS

Note that whenever a patent or literature is referred to below it is to be assumed that all of that patent or literature is to be incorporated by reference in its entirety to the extent the disclosure of this reference is necessary.

The invention relates primarily to protection for one or more occupants of a vehicle during and/or after a rear impact. Rear impact protection is discussed at length in the parent '957 application, and any and all discussions of rear impact safety devices and any and all apparatus and techniques that can be used in combination with rear impact safety devices, basically all of the apparatus and techniques described in the parent '957 application, are incorporated herein. For example, a rear-of-head detector 423 is illustrated in FIG. 68 of the '957 application. This detector 423, which can be one of the types described above, is used to determine the distance from the headrest to the rearmost position of the occupant's head and to therefore control the position of the headrest so that it is properly positioned behind the occupant's head to offer optimum support during a rear impact. Although the headrest of most vehicles is adjustable, it is rare for an occupant to position it properly if at all. Each year there are in excess of 400,000 whiplash injuries in vehicle impacts approximately 90,000 of which are from rear impacts (source: National Highway Traffic Safety Admin.). A properly positioned headrest could substantially reduce the frequency of such injuries, which can be accomplished by the head detector of this invention. The head detector 423 is shown connected schematically to the headrest control mechanism and circuitry 424. This mechanism is capable of moving the headrest up and down and, in some cases, rotating it fore and aft.

Figure 1:
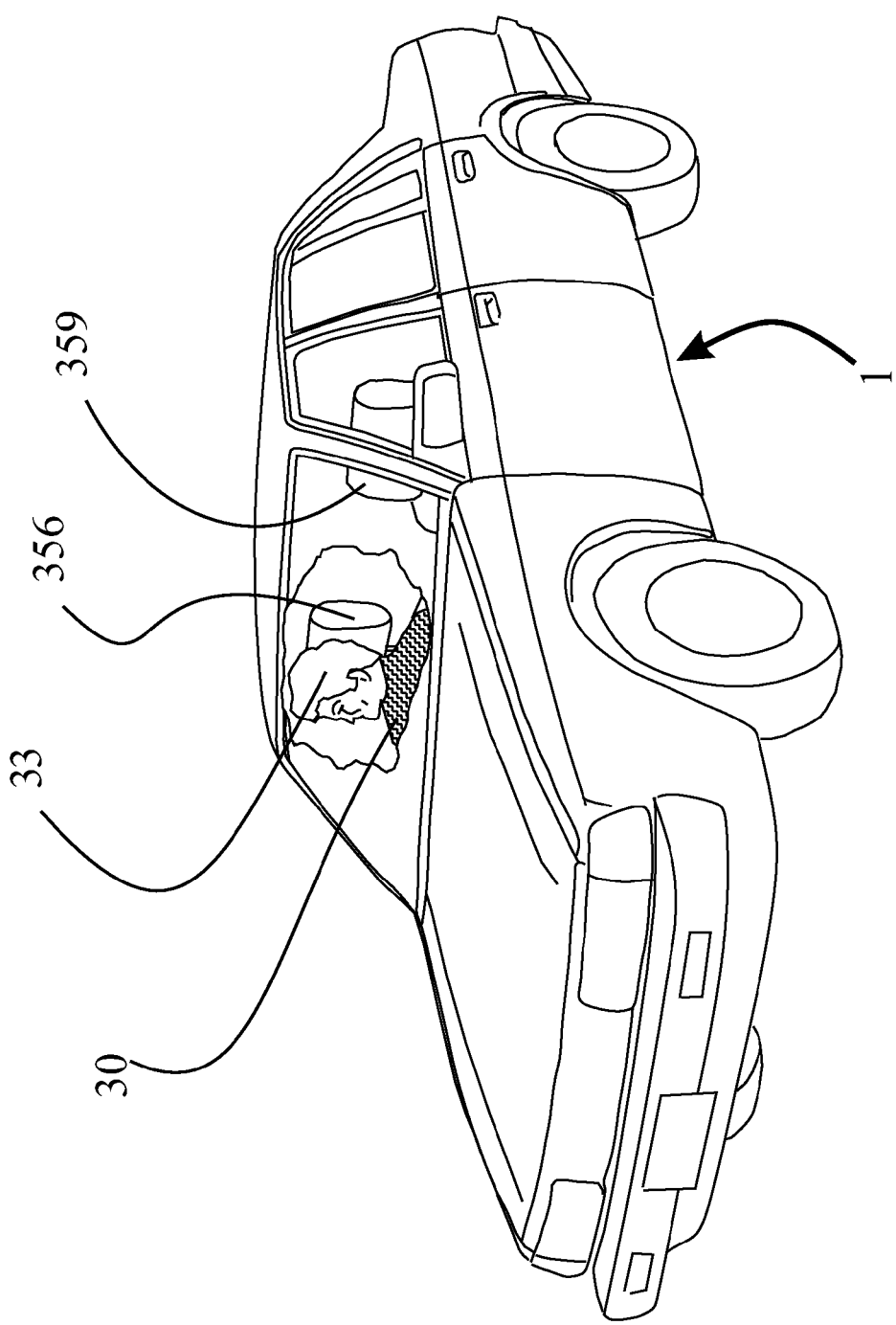
FIG. 1 is perspective view with portions cut away of a motor vehicle having a movable headrest and an occupant sitting on the seat with the headrest adjacent the head of the occupant to provide protection in rear impacts.

Referring to FIGS. 1-11B wherein like reference characters refer to the same or similar elements, FIG. 1 is perspective view with portions cut away of a motor vehicle, shown generally at 1, having two movable headrests 356 and 359 and an occupant 30 sitting on the seat with the headrest 356 adjacent a head 33 of the occupant to provide protection in rear impacts.

Figure 2:
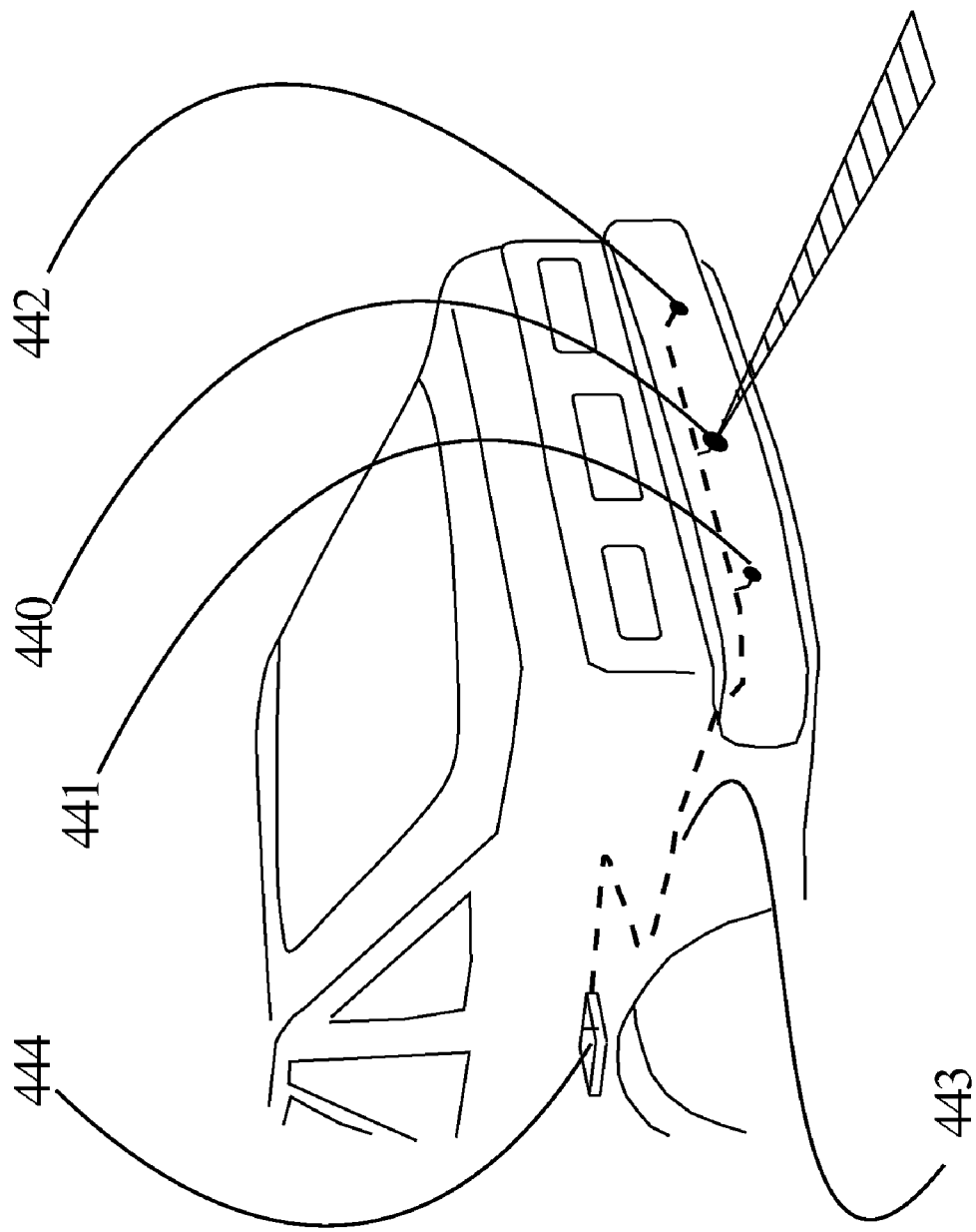
FIG. 2 is a perspective view of the rear portion of the vehicle shown in FIG. 1 showing a rear crash anticipatory sensor connected to an electronic circuit for controlling the position of the headrest in the event of a crash.

In FIG. 2, a perspective view of the rear portion of the vehicle shown in FIG. 1 is shown with a rear impact crash anticipatory sensor, comprising a transmitter 440 and two receivers 441 and 442, connected by appropriate electrical connections, e.g., wire 443, to an electronic circuit or control module 444 for controlling the position of the headrest in the event of a crash. In commonly owned US06343810 an anticipatory sensor system for side impacts is disclosed. This sensor system uses sophisticated pattern recognition technology to differentiate different categories of impacting vehicles. A side impact with a large truck at 20 mph is more severe than an impact with a motorcycle at 40 mph, and, since in that proposed airbag system the driver would no longer be able to control the vehicle, the airbag must not be deployed except in life threatening situations. Therefore, it is critical in order to predict the severity of a side impact, to know the type of impacting vehicle.

To improve the assessment of the impending crash, the crash sensor will optimally determine the position and velocity of an approaching object. The crash sensor can be designed to use differences between the transmitted and reflected waves to determine the distance between the vehicle and the approaching object and from successive distance measurements, the velocity of the approaching object. In this regard, the difference between the transmitted and received waves or pulses may be reflected in the time of flight of the pulse, a change in the phase of the pulse and/or a Doppler radar pulse, or by range gating an ultrasonic pulse, an optical pulse or a radar pulse. As such, the crash sensor can comprise a radar sensor, a noise radar sensor, a camera, a scanning laser radar and/or a passive infrared sensor.

The situation is quite different in the case of rear impacts and the headrest system described herein. The movement of the headrest to the proximity of an occupant's head is not likely to affect his or her ability to control the automobile. Also, it is unlikely that anything but another car or truck will be approaching the rear of the vehicle at a velocity relative to the vehicle of greater than 8 mph, for example. The one exception is a motorcycle and it would not be serious if the headrest adjusted in that situation. Thus, a simple ranging sensor is all that is necessary. There are, of course, advantages in using a more sophisticated pattern recognition system as will be discussed below.

FIG. 2, therefore, illustrates a simple ranging sensor using a transmitter 440 and two receivers 441 and 442. Transmitter 440 may be any wave-generating device such as an ultrasonic transmitter while the receivers 441,442 are compatible wave-receiving devices such as ultrasonic receivers. The ultrasonic transmitter 440 transmits ultrasonic waves. These transducers are connected to the electronic control module (ECM) 444 by means of wire 443, although other possible connecting structure (wired or wireless) may also be used in accordance with the invention. Other configurations of the transmitter 440, receivers 441,442 and ECM 444 might be equally or more advantageous. The sensors determine the distance of the approaching object and determine its velocity by differentiating the distance measurements or by use of the Doppler effect or other appropriate method. Although an ultrasonic system is illustrated herein, radar, electromagnetic, e.g., optical, or other systems could also be used as well as any appropriate number of transmitters and receivers.

Although a system based on ultrasonics is generally illustrated and described above and represents one of the best mode of practicing this invention, it will be appreciated by those skilled in the art that other technologies employing electromagnetic energy such as optical, infrared, radar, capacitance etc. could also be used. Also, although the use of reflected energy is disclosed, any modification of the energy by an object behind the vehicle is contemplated including absorption, phase change, transmission and reemission or even the emission or reflection of natural radiation. Such modification can be used to determine the presence of an object behind the vehicle and the distance to the object.

Thus, the system for determining the location of the head of the occupant can comprise an electric field sensor, a capacitance sensor, a radar sensor, an optical sensor, a camera, a three-dimensional camera, a passive infrared sensor, an ultrasound sensor, a stereo sensor, a focusing sensor and a scanning system. One skilled in the art would be able to apply these systems in the invention in view of the disclosure herein and the knowledge of the operation of such systems attributed to one skilled in the art.

Although pattern recognition systems, such as neural nets, might not be required, such a system would be desirable. With pattern recognition, other opportunities become available such as the determination of the nature of objects behind the vehicle. This could be of aid in locating and recognizing objects, such as children, when vehicles are backing up and for other purposes. Although some degree of pattern recognition can be accomplished with the system illustrated in FIG. 2, especially if an optical system is used instead of the ultrasonic system illustrated, additional transducers significantly improve the accuracy of the pattern recognition systems if either ultrasonics or radar systems are used.

Figure 3:
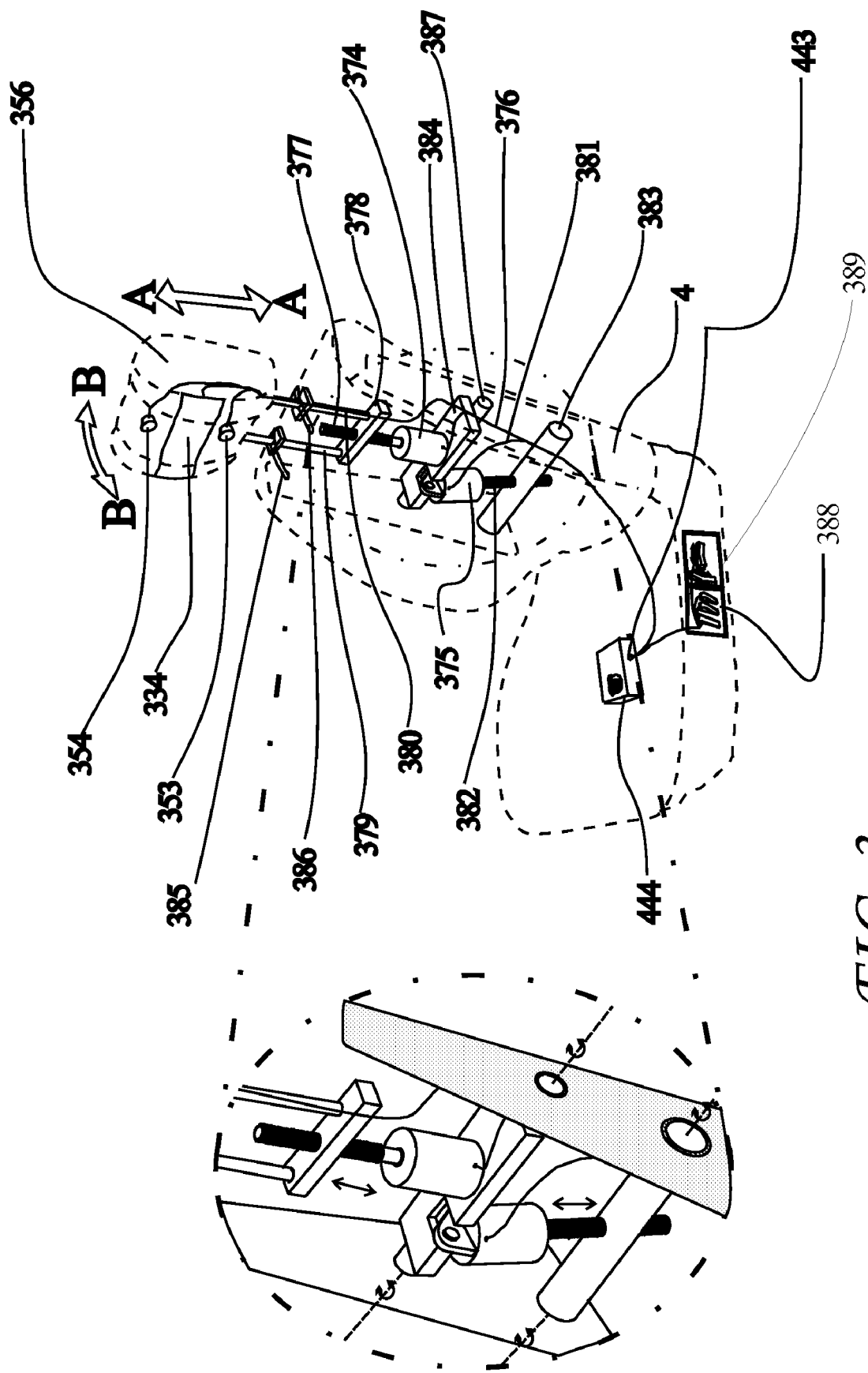
FIG. 3 is a perspective view of a headrest control mechanism mounted in a vehicle seat and ultrasonic head location sensors consisting of one transmitter and one receiver plus a head contact sensor, with the seat and headrest shown in phantom.

The wire 443 shown in FIG. 2 leads to the electronic control module 444 which is also shown in FIG. 3. FIG. 3 is a perspective view of a headrest actuation mechanism, mounted in a vehicle seat 4, and transducers 353, 354 plus a head contact sensor 334. Transducer 353 may be an ultrasonic transmitter and transducer 354 may be an ultrasonic receiver. The transducers 353,354 may be based on any type of propagating phenomenon such as electromagnetics (for example capacitive systems), and are not limited to use with ultrasonics. The seat 4 and headrest 356 are shown in phantom. Vertical motion of the headrest 356 is accomplished when a signal is sent from control module 444 to servomotor 374 through wire 376. Servomotor 374 rotates lead screw 377 which mates with a threaded hole in elongate member 378 causing it to move up or down depending on the direction of rotation of the lead screw 377. Headrest support rods 379 and 380 are attached to member 378 and cause the headrest 356 to translate up or down with member 378. In this manner, the vertical position of the headrest 356 can be controlled as depicted by arrow A-A.

Wire 381 leads from the control module 444 to servomotor 375 which rotates lead screw 382. Lead screw 382 mates with a threaded hole in elongate, substantially cylindrical shaft 383 which is attached to supporting structures within the seat shown in phantom. The rotation of lead screw 382 rotates servo motor support 384 which in turn rotates headrest support rods 379 and 380 in slots 385 and 386 in the seat 4. In this manner, the headrest 356 is caused to move in the fore and aft direction as depicted by arrow B-B. There are other designs which accomplish the same effect of moving the headrest to where it is proximate to the occupant's head The operation of the system is as follows. When an occupant is seated on a seat containing the headrest and control system described above, the transducer 353 emits ultrasonic energy which reflects off of the back of the head of the occupant and is received by transducer 354. An electronic circuit containing a microprocessor determines the distance from the head of the occupant based on the time period between the transmission and reception of an ultrasonic pulse. The headrest 356 moves up and/or down until it finds the vertical position at which it is closest to the head of the occupant. The headrest remains at that position. Based on the time delay between transmission and reception of an ultrasonic pulse, the system can also determine the longitudinal distance from the headrest to the occupant's head. Since the head may not be located precisely in line with the ultrasonic sensors, or the occupant may be wearing a hat, coat with a high collar, or may have a large hairdo, there may be some error in the longitudinal measurement. This problem is solved in an accident through the use of a contact switch 334 on the surface of the headrest. When the headrest contacts a hard object, such as the rear of an occupant's head, the contact switch 334 closes and the motion of the headrest stops.

Although a system based on ultrasonics is generally illustrated and described above and represents the best mode of practicing this invention, it will be appreciated by those skilled in the art that other technologies employing electromagnetic energy such as optical, infrared, radar, capacitance etc. could also be used. Also, although the use of reflected energy is disclosed, any modification of the energy by the occupant's head is contemplated including absorption, capacitance change, phase change, transmission and reemission. Such modification can be used to determine the presence of the occupant's head adjacent the headrest and/or the distance between the occupant's head and the headrest.

When a vehicle approaches the target vehicle, the target vehicle containing the headrest and control system of this invention, the time period between transmission and reception of ultrasonic waves, for example, shortens indicating that an object is approaching the target vehicle. By monitoring the distance between the target vehicle and the approaching vehicle, the approach velocity of the approaching vehicle can the calculated and a decision made by the circuitry in control module 444 that an impact above a threshold velocity is about to occur. The control module 444 then sends signals to servo motors 375 and 374 to move the headrest to where it contacts the occupant in time to support the occupant's head and neck and reduce or eliminate a potential whiplash injury as explained in more detailed below.

The seat also contains two switch assemblies 388 and 389 for controlling the position of the seat 4 and headrest 356. The headrest control switches 389 permit the occupant to adjust the position of the headrest in the event that the calculated position is uncomfortably close to or far from the occupant's head. A woman with a large hairdo might find that the headrest automatically adjusts so as to contact her hairdo. This might be annoying to the woman who could then position the headrest further from her head. For those vehicles which have a seat memory system for associating the seat position with a particular occupant, the position of the headrest relative to the occupant's head can also be recorded. Later, when the occupant enters the vehicle, and the seat automatically adjusts to the occupant's recorded in memory preference, the headrest will similarly automatically adjust. In U.S. Pat. No. 5,822, 437, a method of passively recognizing a particular occupant is disclosed.

Thus, an automatic adjustment results which moves the headrest to each specific occupant's desired and memorized headrest position. The identification of the specific individual occupant, for which memory look-up or the like would occur, can be by height sensors, weight sensors (for example placed in a seat), or by pattern recognition systems, or a combination of these and other systems or techniques, as disclosed herein, in the parent '957 application, and in the above-referenced patent applications and granted patents.

Figure 5:
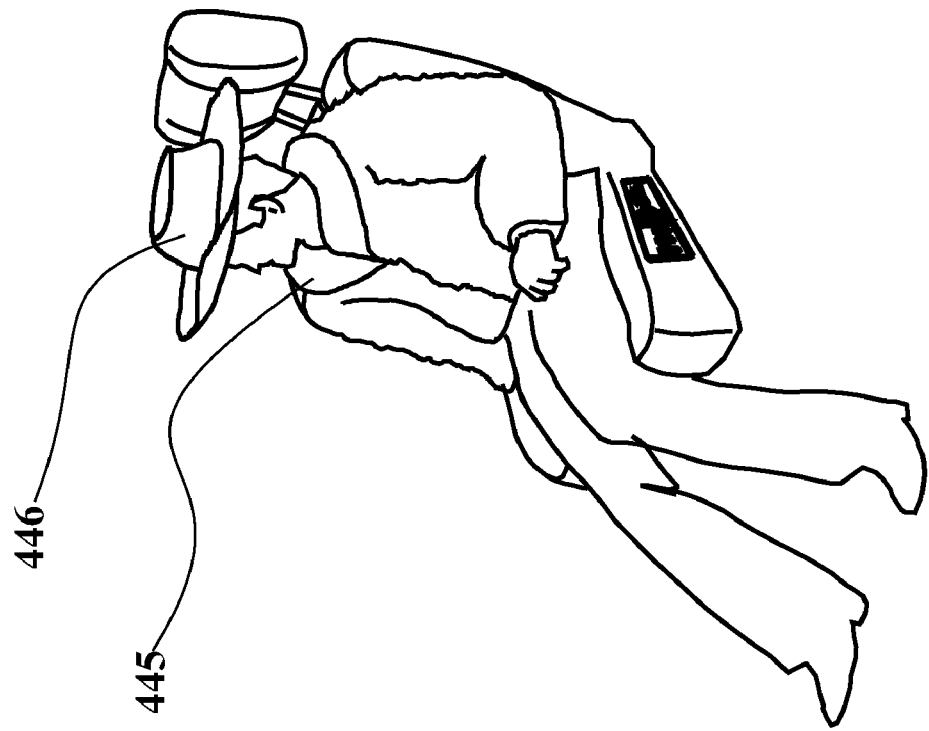
FIG. 5 is a perspective view of a male vehicle occupant wearing a winter coat and a large hat.
Figure 4:
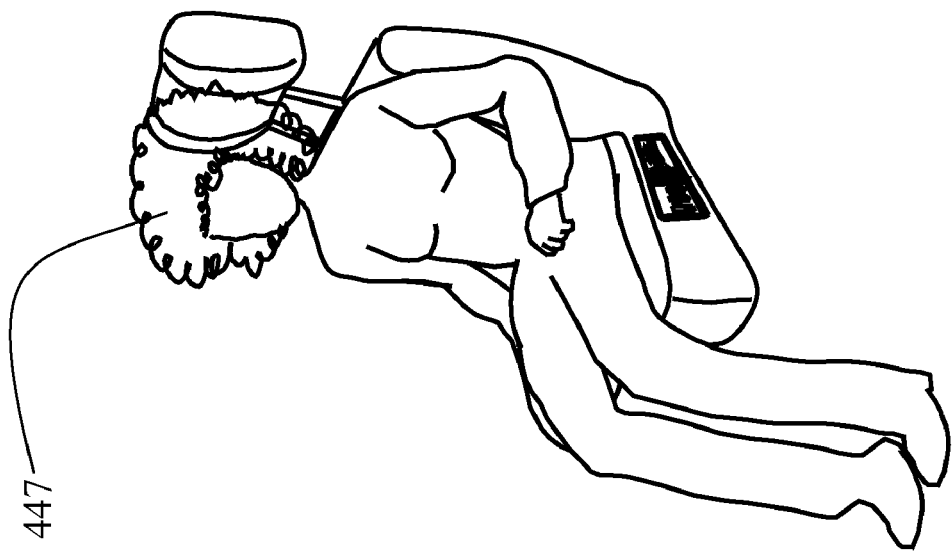
FIG. 4 is a perspective view of a female vehicle occupant having a large hairdo and also showing switches for manually adjusting the position of the headrest.

One advantage of this system is that it moves the headrest toward the occupant's head until it senses a resistance characteristic of the occupant's head. Thus, the system will not be fooled by a high coat collar 445 or hat 446, as illustrated in FIG. 5, or other article of clothing or by a large hairdo 447 as illustrated in FIG. 4. The headrest continues to be moved until it contacts something relatively rigid as determined by the contact switch 334.

A key advantage of this system is that there is no permanent damage to the system when it deploys during an accident. After the event it will reset without an expensive repair. In fact, it can be designed to reset automatically.

An ultrasonic sensor in the headrest has previously been proposed in a U.S. patent to locate the occupant for the out-of-position occupant problem. In that system, no mention is made as to how to find the head. In the headrest location system described herein, the headrest can be moved up and down in response to the instant control systems to find the location of the back of the occupant's head. Once it has been found the same sensor is used to monitor the location of the person's head. Other methods of finding the location of the head of an occupant are possible including in particular an electromagnetic based system such as a camera, capacitance sensor or electric field sensor.

Figure 6:
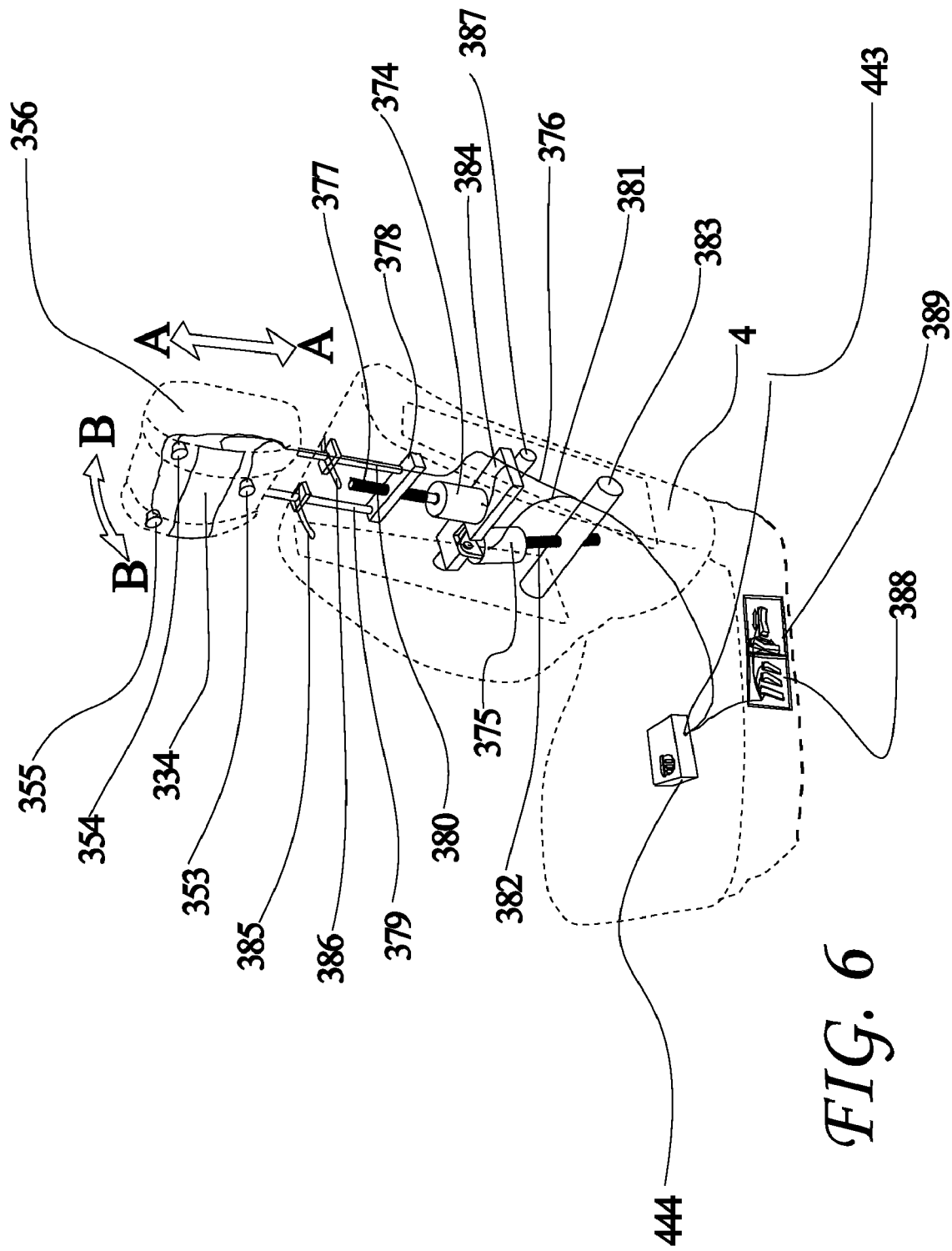
FIG. 6 is a view similar to FIG. 3 showing an alternate design of a head sensor using one transmitter and three receivers for use with a pattern recognition system.

An improvement to the system described above results when pattern recognition technology is added. FIG. 6 is view similar to FIG. 3 showing an alternate design of a head sensor using three transducers 353, 354 and 355 which can be used with a pattern recognition system. Transducer 353 can perform both as a transmitter and receiver while transducers 354,355 can perform only as receivers. Transducers 354,355 can be placed on either side of and above transducer 353. Using this system and an artificial neural network, or other pattern recognition system, as part of the electronic control module 444, or elsewhere, an accurate determination of the location of an occupant's head can, in most cases, be accomplished even when the occupant has a large hairdo or hat. In this case, the system can be trained for a wide variety of different cases prior to installation into the vehicle. This training is accomplished by placing a large variety of different occupants onto the driver's seat in a variety of different positions and recording digitized data from transducers 353, 354 and 355 along with data representing the actual location of the occupant's head. The different occupants include examples of large and small people, men and women, with many hair, hat, and clothing styles. Since each of these occupants is placed at a variety of different positions on the seat, the total data set, called the "training set", can consist of at least one thousand, and typically more than 100,000, cases. This training set is then used to train the neural network, or other similar trainable pattern recognition technology, so that the resulting network can locate the occupant's head in the presence of the types of obstructions discussed above whatever an occupant occupies the driver's seat.

Figure 7:
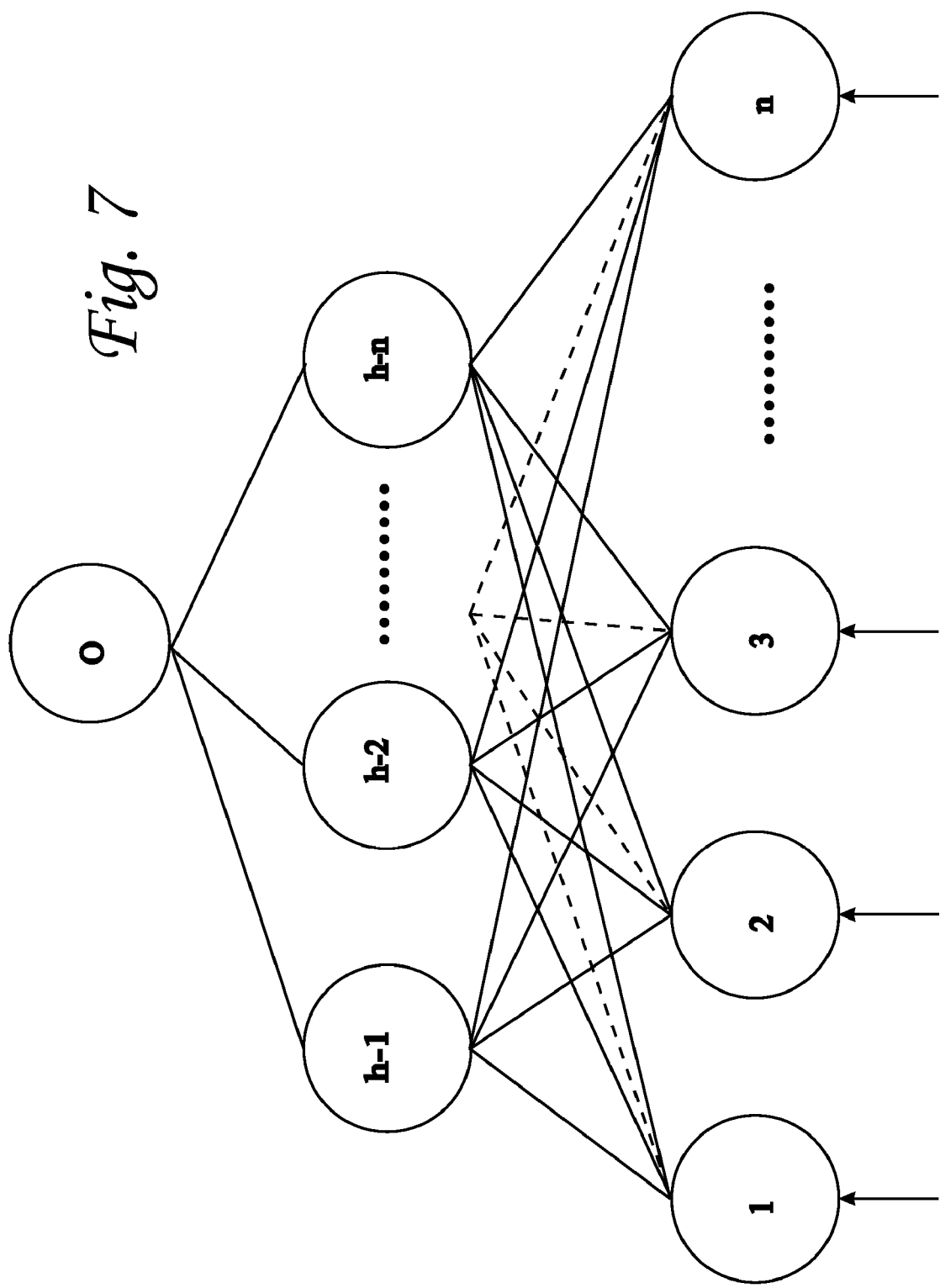
FIG. 7 is a schematic view of an artificial neural network pattern recognition system of the type used to recognize an occupant's head.

FIG. 7 is a schematic view of an artificial neural network of the type used to recognize an occupant's head and is similar to that presented in FIG. 19B of the '957 application. The theory of neural networks including many examples can be found in several books on the subject including: *Techniques and Application Of Neural Networks*, edited by Taylor, M. and Lisboa, P., Ellis Horwood, West Sussex, England, 1993; *Naturally Intelligent Systems*, by Caudill, M. and Butler, C., MIT Press, Cambridge Mass., 1990; and, *Digital Neural Networks*, by Kung, S. Y., PTR Prentice Hall, Englewood Cliffs, N.J., 1993. the neural network is presented here as an example of a pattern recognition technology. Other pattern recognition algorithms, such as neural-fuzzy systems, are being developed which, in some cases, have superior performance to pure neural networks.

The process of locating the head of an occupant can be programmed to begin when an event occurs such as the closing of a vehicle door or the shifting of the transmission out of the PARK position. The ultrasonic transmitting/receiving transducer 353, for example, transmits a train of ultrasonic waves toward the head of the occupant. Waves reflected from the occupant's head are received by transducers 353, 354 and 355. An electronic circuit containing an analog to digital converter converts the received analog signal to a digital signal which is fed into the input nodes numbered 1, 2, 3, ... , n, shown on FIG. 7. The neural network algorithm compares the pattern of values on nodes 1 through N with patterns for which it has been trained, as discussed above. Each of the input nodes is connected to each of the second layer nodes, called the hidden layer, either electrically as in the case of a neural computer or through mathematical functions containing multiplying coefficients called weights, described in more detail below. The weights are determined during the training phase while creating the neural network as described in detail in the above text references. At each hidden layer node a summation occurs of the values from each of the input layer nodes, which have been operated on by functions containing the weights, to create a node value. Although an example using ultrasound has been described, the substitution of other sensors such as optical, radar or capacitors will now be obvious to those skilled in the art.

The hidden layer nodes are in like manner connected to the output layer nodes, which in this example is only a single node representing the longitudinal distance to the back of the occupant's head. During the training phase, the distance to the occupant's head for a large variety of patterns is taught to the system. These patterns include cases where the occupant is wearing a hat, has a high collar, or a large hairdo, as discussed above, where a measurement of the distance to the back of the occupant's head cannot be directly measured. When the neural network recognizes a pattern similar to one for which it has been trained, it then knows the distance to the occupant's head. The details of this process are described in the above listed referenced texts and will not be presented in detail here. The neural network pattern recognition system described herein is one of a variety of pattern recognition technologies which are based on training. The neural network is presented herein as one example of the class of technologies referred to as pattern recognition technologies. Ultrasonics is one of many technologies including optical, infrared, capacitive, radar, electric field or other electromagnetic based technologies. Although the reflection of waves was illustrated, any modification of the waves by the head of the occupant is anticipated including absorption, capacitance change, phase change, transmission and reemission. Additionally, the radiation emitted from the occupant's head can be used directly without the use of transmitted radiation. Combinations of the above technologies can be used.

A time step, such as one tenth of a millisecond, is chosen as the period at which the analog to digital converter (ADC) averages the output from the ultrasonic receivers and feeds data to the input nodes. For one preferred embodiment of this invention, a total of one hundred input nodes is typically used representing ten milliseconds of received data. The input to each input node is a preprocessed combination of the data from the three receivers. In another implementation, separate input nodes would be used for each transducer. Alternately, the input data to the nodes can be the result of a preprocessing algorithm which combines the data taking into account the phase relationships of the three return signals to obtain a map or image of the surface of the head using the principles of phased array radar. Although a system using one transmitter and three receivers is discussed herein, where one transducer functions as both a transmitter and receiver, even greater resolution can be obtained if all three receivers also act as transmitters.

In the example above, one hundred input nodes, twelve hidden layer nodes and one output layer node are typically used. In this example received data from only three receivers were considered. If data from additional receivers is also available the number of input layer nodes could increase depending on the preprocessing algorithm used. If the same neural network is to be used for sensing rear impacts, one or more additional output nodes might be used, one for each decision. The theory for determining the complexity of a neural network for a particular application has been the subject of many technical papers as well as in the texts referenced above and will not be presented in detail here. Determining the requisite complexity for the example presented here can be accomplished by those skilled in the art of neural network design and is discussed briefly below.

The pattern recognition system described above defines a method of determining the probable location of the rear of the head of an occupant and, will therefore determine, if used in conjunction with the anticipatory rear impact sensor, where to position a deployable occupant protection device in a rear collision, and comprises:

(a) obtaining an ultrasonic, analog signal from transducers mounted in the headrest;

(b) converting the analog signal into a digital time series;

(c) entering the digital time series data into a pattern recognition system such as a neural network;

(d) performing a mathematical operation on the time series data to determine if the pattern as represented by the time series data is nearly the same as one for which the system has been trained; and (e) calculating the probable location of the occupant's head if the pattern is recognizable.

The particular neural network described and illustrated above contains a single series of hidden layer nodes. In some network designs, more than one hidden layer is used although only rarely will more than two such layers appear. There are of course many other variations of the neural network architecture illustrated above, as well as other pattern recognition systems, which appear in the literature. For the purposes herein, therefore, "neural network" can be defined as a system wherein the data to be processed is separated into discrete values which are then operated on and combined in at least a two stage process and where the operation performed on the data at each stage is in general different for each of the discrete values and where the operation performed is at least determined through a training process. The operation performed is typically a multiplication by a particular coefficient or weight and by different operation, therefore is meant in this example, that a different weight is used for each discrete value.

The implementation of neural networks can take at least two forms, an algorithm programmed on a digital microprocessor or in a neural computer. Neural computer chips are now available.

In the particular implementation described above, the neural network is typically trained using data from 1000 or more than 100,000 different combinations of people, clothes, wigs etc. There are, of course, other situations which have not been tested. As these are discovered, additional training will improve the performance of the pattern recognition head locator.

Once a pattern recognition system is implemented in a vehicle, the same system can be used for many other pattern recognition functions as described herein and in the above referenced patents and patent applications. For example, in U.S. Pat. No. 5,829,792, the use of neural networks as a preferred pattern recognition technology is disclosed for identifying a rear facing child seat located on the front passenger seat of an automobile. This same patent also discloses many other applications of pattern recognition technologies for use in conjunction with monitoring the interior of an automobile passenger compartment.

As described in U.S. Pat. No. 5,290,091 to Dellanno et al. and U.S. Pat. No. 5,580,124 to Dellanno, whiplash injuries typically occur when there is either no head support or when only the head of the occupant is supported during a rear impact. To minimize these injuries, both the head and neck should be supported. In Dellanno, the head and neck are supported through a pivoting headrest which first contacts the head of the occupant and then rotates to simultaneously support both the head and the neck. The force exerted by the head and neck onto the pivoting headrest is distributed based on the relative masses of the head and neck. Dellanno assumes that the ratio of these masses is substantially the same for all occupants and that the distances between centers of mass of the head and neck is approximately also proportional for all occupants. To the extent that this is not true, a torque will be applied to the headrest and cause a corresponding torque to be applied to the head and neck of the occupant. Ideally, the head and neck would be supported with just the required force to counteract the inertial force of each item. Obviously this can only approximately be accomplished with the Dellanno pivoting headrest especially when one considers that no attempt has been made to locate the headrest relative to the occupant and the proper headrest position will vary from occupant to occupant. Dellanno also assumes that the head and neck will impact and in fact bounce off of the headrest. This in fact can increase the whiplash injuries since the change in velocity of the occupant's head will be greater that if the headrest absorbed the kinetic energy and the head did not rebound. A far more significant improvement to eliminating whiplash injuries can be accomplished by eliminating this head impact and the resulting rebound as is accomplished in the present invention.

Automobile engineers attempt to design vehicle structures so that in an impact the vehicle is accelerated at an approximately constant acceleration. It can be shown that this results in the most efficient use of the vehicle structure in absorbing the crash energy. It also minimizes the damage to the vehicle in a crash and thus the cost of repair. Let us assume, therefore, that in a particular rear impact that the vehicle accelerates at a constant 15 g acceleration. Let us also assume that the vehicle seat back is rigidly attached to the vehicle structure at least during the early part of the crash, so that up until shortly after the occupant's head has impacted the headrest the seat back also is accelerating at a constant 15 g's. Finally let us assume that the occupant's head is initially displaced 4 inches from the headrest and that during impact the head compresses the headrest 1 inch. When the occupant's head impacts the headrest it must now make up for the difference in velocity between the headrest and the head during the period that it is compressing the headrest 1 inch. It can be demonstrated that this requires an acceleration of approximately 75 g's or five times the acceleration which the head would experience if it were in contact with the headrest at the time that the rear impact occurs.

Figure 8:
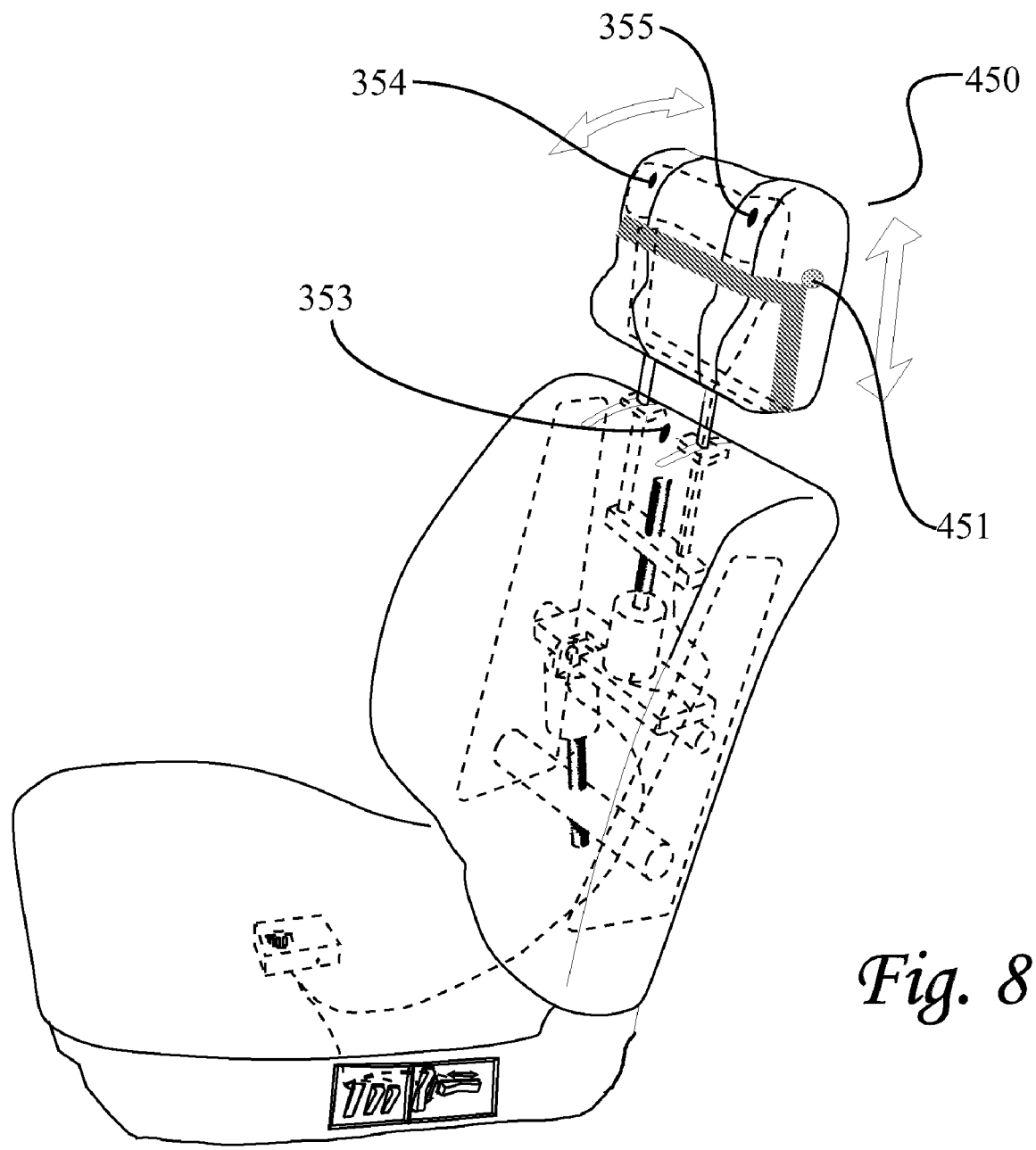
FIG. 8 is a perspective view of a system for automatically adjusting a head and neck supporting headrest.

The Dellanno headrest, as shown for example in FIG. 3 of US05290091, is a worthwhile addition to solving the whiplash problem after the headrest has been positioned against the head and neck of the occupant. The added value of the Dellanno design over simpler designs, especially considering the inertial effects of having to rapidly rotate the headrest while the crash is taking place, is probably not justified. FIG. 8 illustrates a headrest design which accomplishes the objectives of the Dellanno headrest in a far simpler structure and at less potential injury to the occupant.

In FIG. 8, a seat with a movable headrest similar to the one illustrated in FIG. 3 is shown with a headrest designated 450 designed to provide support to both the head and neck which eliminates the shortcomings of the Dellanno headrest. The ultrasonic transducer 353, which includes both a transmitter and receiver, has been moved to an upper portion of the seat back, not the headrest, to facilitate the operation of the support system as described below. The construction of the headrest is illustrated in a cutaway view shown in FIG. 8A which is an enlarged view of the headrest of FIG. 8.

Figure 8A:
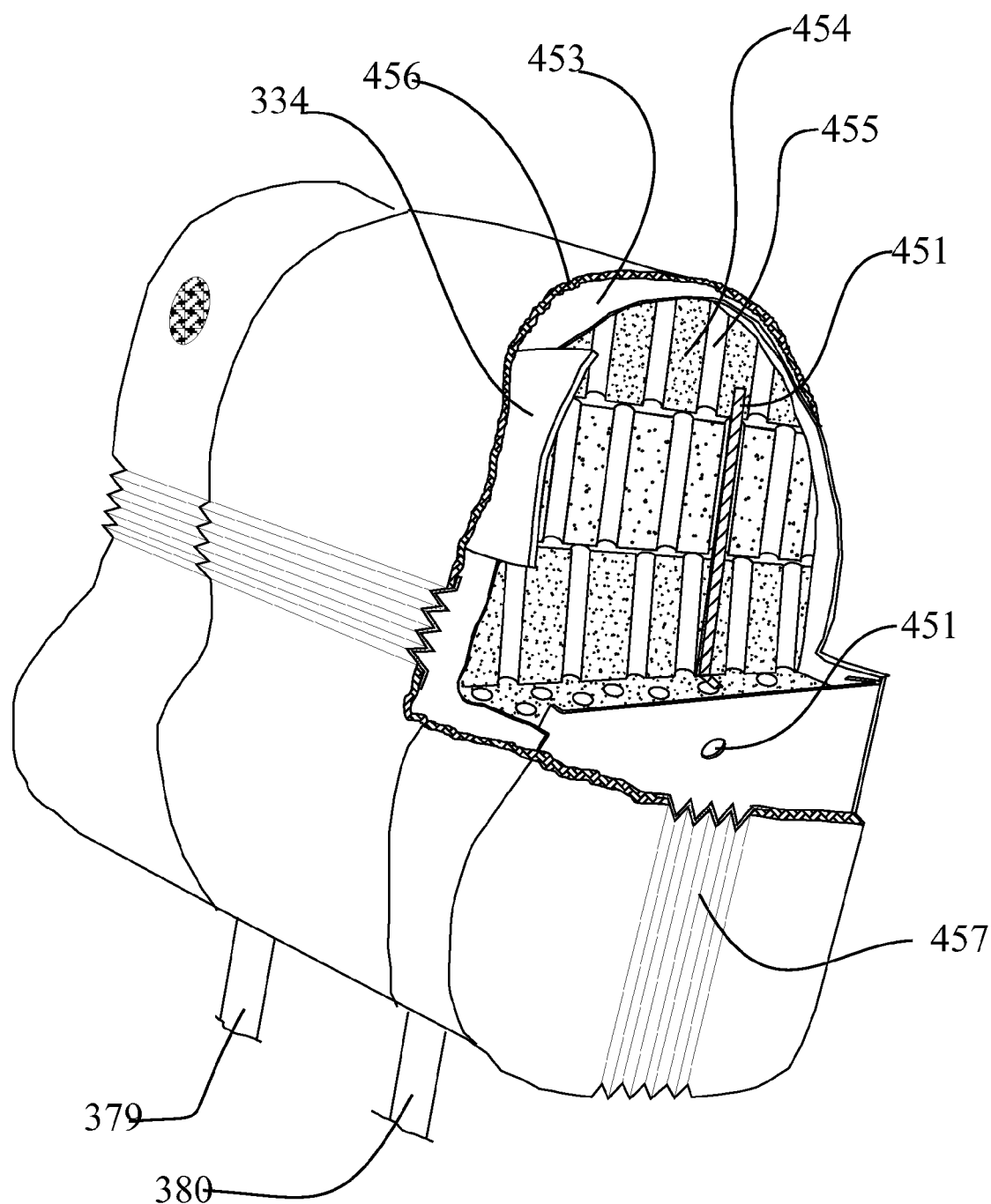
FIG. 8A is a perspective view with portions cut away and removed of the headrest of FIG. 7.

In FIG. 8A, the headrest is constructed of a support or frame 452 which is attached to rods 379 and 380 and extends along the sides and across the back of the headrest. Support 452 may be made of a somewhat rigid material. This support 452 helps control the motion of a pre-inflated bag 453 as it deforms under the force from the head of the occupant to where it contacts and provides support to the occupant's neck. Relatively low density open cell foam 454 surrounds the support 452 giving shape to the remainder of the headrest. As shown in FIG. 8A, the open call foam 454 can also have channels or openings 455 extending in a direction generally from a top of the headrest 450 to a bottom of the headrest 450, although such channels are not required. The direction of the channels or openings 455 facilitates the desired movement of the fluid in the bag 453 and constrains the fluid flow upon impact of the occupant's head against the headrest 450, i.e., a generally vertical movement in the case of the illustrated headrest 450. The open call foam 454 is covered by a thin membrane, possibly made from plastic, or the bag 453 (also referred to as an airbag herein which is appropriate when the fluid in the bag 453 is air—although the fluid within bag 453 may be other than air), and by a decorative cover 456 made of any suitable, acceptable material. The bag 453 is sealed surrounding the support 452 and plastic or rubber foam 454 such that any flow of fluid such as air into or out of the bag 453 is through a hole in the bag 453 adjacent to a vent hole 451 in the supporting structure, i.e., the cover 456. Elastic stretch seams 457 can be placed in the sides, bottom and/or across the front of the headrest cover to permit the headrest surface to deform to the contour of, and to properly support, the occupant's head and neck. A contact switch 334 is placed just inside cover 456 and functions as described above.

Instead of channels, the properties of the foam can be selected to provide the desired flow of gas, e.g., the design, shape, positioning and construction of the foam can be controlled and determined during manufacture to obtain the desired flow properties.

Figure 9B:
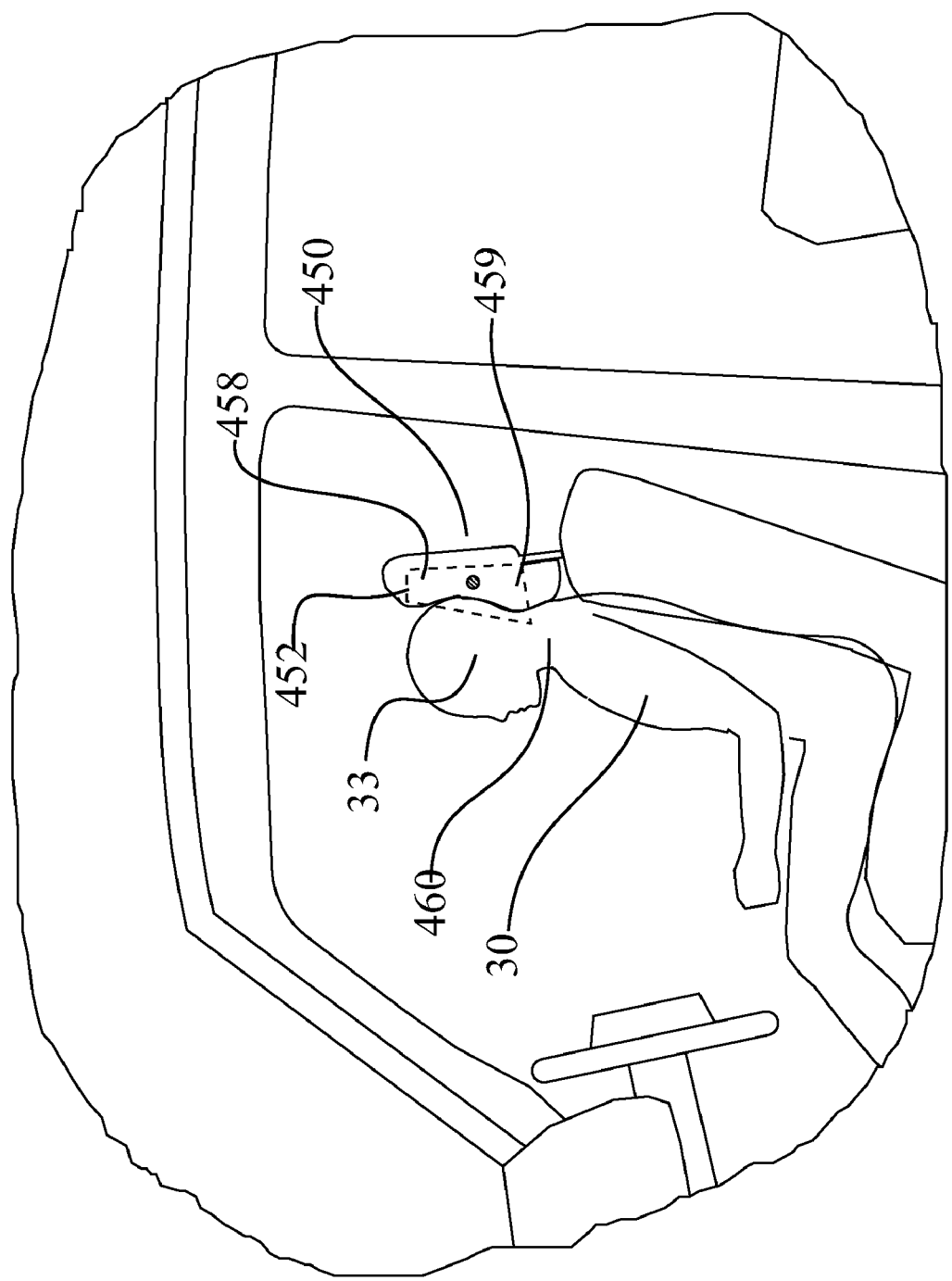
FIG. 9B is a view as in FIG. 8A with the headrest in the head contact position as would happen in anticipation of a rear crash.

FIGS. 9A and 9B illustrate the operation of the headrest 450. In anticipation of a rear impact (or any other type of impact), as determined by the proximity sensors described above or any other anticipatory crash sensor system, headrest 450 is moved from its position as shown in FIG. 9A to its position as shown in FIG. 9B. This movement is enabled by control of the displacement mechanism, such as those described above with reference to FIG. 3, as effected through the control module 444. The forward movement of the headrest 450 should continue until the headrest 450 contacts or impacts with the occupant's head as determined by a contact switch 334. When headrest 450 contacts or impacts the head 33 of the occupant 30, it exerts sufficient pressure against head 33 to cause air (the fluid in the bag 453 for the purposes of this explanation) to flow from the upper portion 458 to the lower portion 459 of headrest 450, which causes this lower portion to expand as the upper portion contracts. This initial flow of air takes place as the foam 454 compresses under the force of contact between the head and upper portion 458 of headrest 450. The initial shape of headrest 450 is created by the shape of the foam 454; however once the occupants head 33 begins to exert pressure on the upper portion 458 the air is compressed and begins to flow to the lower portion 459 causing it to expand until it contacts the neck 460 of the occupant 30. (If the occupant's head were to exert pressure on the lower portion 459 or once the pressure on the upper portion 458 were removed, air would flow from the lower portion 459 to the upper portion 458.) In this manner, by the flow of air, the pressure is equalized on the head and neck of the occupant 30 thereby preventing the whiplash type motions described in the Dellanno patents, as well as numerous technical papers on the subject. The headrest of this invention acts very much like a pre-inflated airbag providing force where force is needed to counteract the accelerations of the occupant. It accomplishes this force balancing without the need to rotate a heavy object such as the headrest in the Dellanno patent which by itself could introduce injuries to the occupant.

In addition to use as a headrest, the structure described above can be used in other applications for cushioning an occupant of a vehicle, i.e., for cushioning another part of the occupant's body in an impact. The cushioning arrangement would thus comprise a frame or support coupled to the vehicle and a fluid-containing bag attached to the frame or other support. A deformable cover would also be preferred. The bag, including the cell foam and vent hole as described above, would allow movement of the fluid within the bag to thereby alter the shape of the bag, upon contact with the part of the occupant's body, and enable the bag to conform to the part of the occupant's body. This would effectively cushion the occupant's body during an impact. Further, the cushioning arrangement could be coupled to the anticipatory crash sensor through a control unit (i.e., control module 444) and displacement mechanism in a similar manner as headrest 450, to thereby enable movement of the cushioning arrangement against the part of the occupant's body just prior to or coincident with the crash.

A headrest using a pre-inflated airbag type structure composed of many small airbags is disclosed in FIG. 9 of US05098124 to Breed et al. The headrest disclosed here differs primarily through the use of a single pre-inflated fluid-containing bag, fluid-filled bag or airbag which when impacted by the head of the occupant, deforms by displacing the surface of the headrest outwardly to capture and support the neck of the occupant. The use of an airbag to prevent whiplash injuries is common for accidents involving frontal impacts and driver and passenger side airbags. Whiplash injuries have not become an issue in frontal impacts involving airbags, therefore, the ability of airbags to prevent whiplash injuries in frontal impacts is proven. The use of airbags to prevent whiplash injuries in rear impacts is therefore appropriate and, if a pre-inflated airbag as described herein is used, results in a simple low-cost and effective headrest design. Other airbag designs are possible although the pre-inflated design as described herein is preferred.

This pre-inflated airbag headrest has another feature which further improves its performance. The vent hole 451 is provided to permit some of the air in the headrest to escape in a controlled manner thereby dampening the motion of the head and neck much in the same way that a driver side airbag has vent holes to dissipate the energy of the impacting driver during a crash. An appropriate regulation device may also be associated with the vent hole 451 of the headrest 450 to regulate the escaping air. Without the vent hole, there is risk that the occupant's head and neck will rebound off of the headrest, as is also a problem in the Dellanno patents. This can happen especially when, due to pre-crash braking or an initial frontal impact such as occurs in a multiple car accident, the occupant is sufficiently out of position that the headrest cannot reach his or her head before the rear impact. Without this feature the acceleration on the head will necessarily be greater and therefore the opportunity for injury to the neck is increased. The size of this hole is determined experimentally or by mathematical analysis and computer simulation. If it is too large, too much air will escape and the headrest will bottom out on the support. If it is too small, the head will rebound off of the headrest thereby increasing the chance of whiplash injury. A region of controlled porosity could be substituted for hole 451.

Finally, a side benefit of this invention is that it can be used to determine the presence of an occupant on the front passenger seat. This information can then be used to suppress deployment of an airbag if the seat is unoccupied.

Figure 10A:
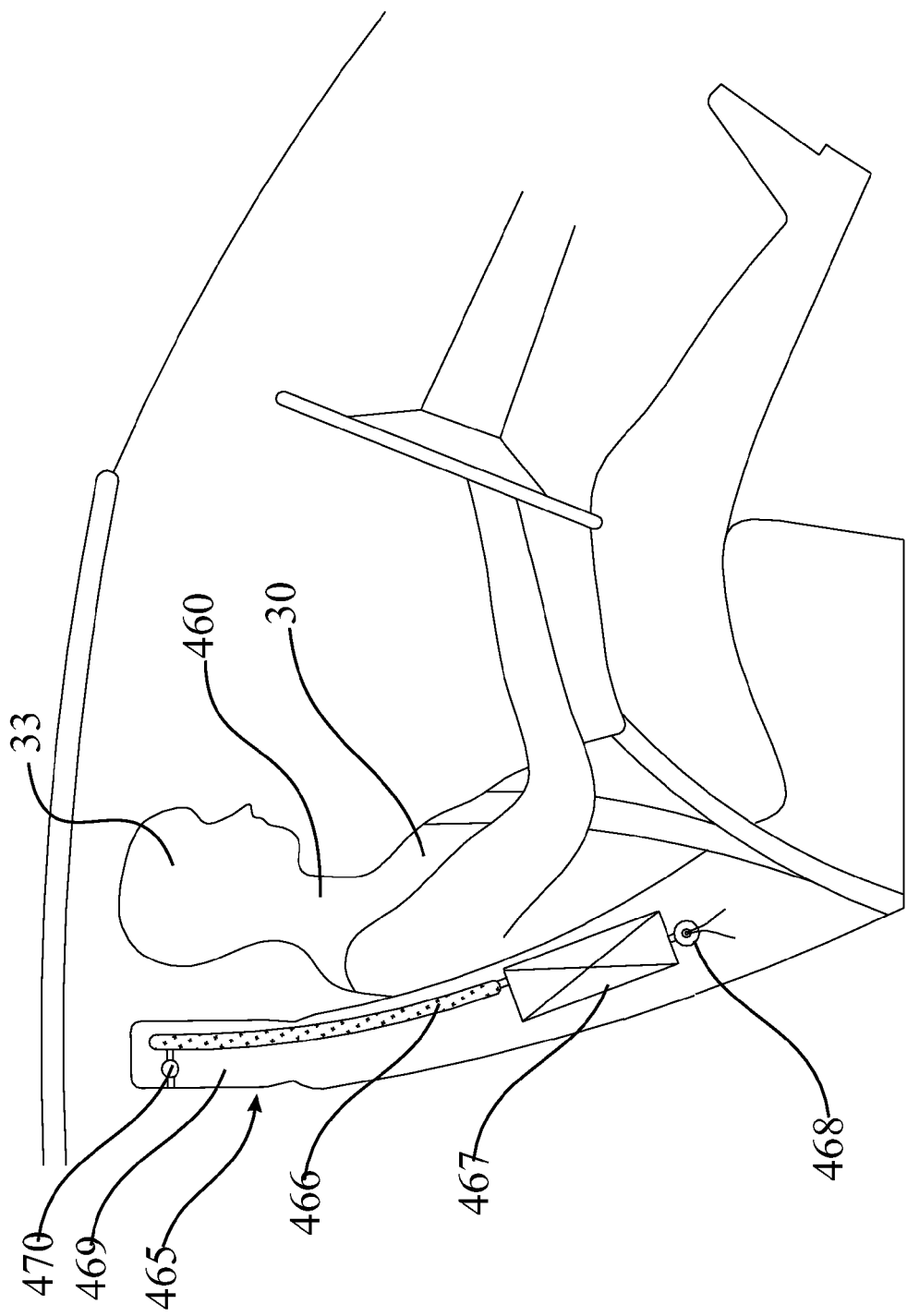
FIG. 10A is a side view of an occupant seated in the driver seat of an automobile having an integral seat and headrest and an inflatable pressure controlled bladder with the bladder in the normal position.
Figure 10B:
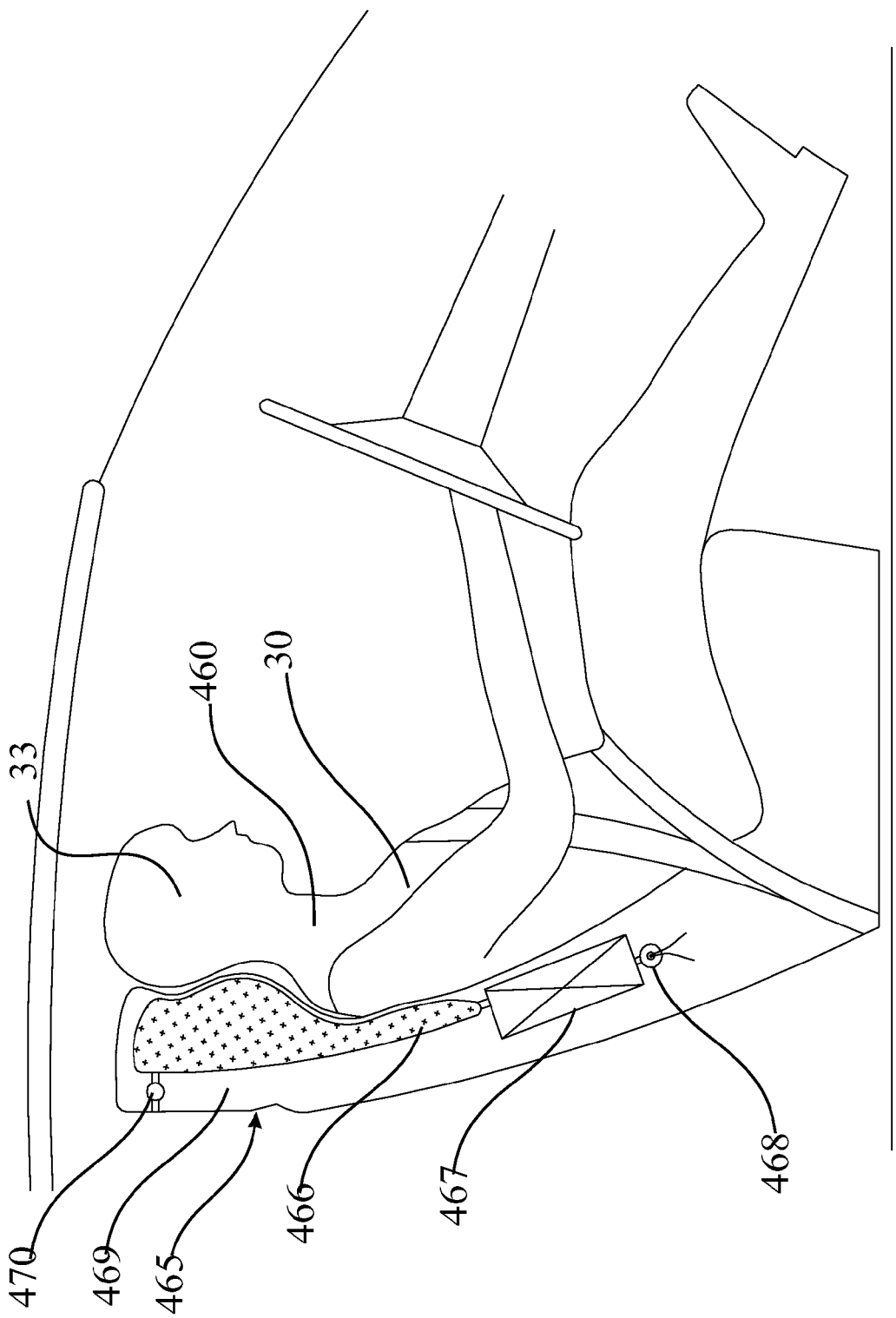
FIG. 10B is a view as in FIG. 9A with the bladder expanded in the head contact position as would happen in anticipation of, e.g., a rear crash.

FIG. 10A is a side view of an occupant seated in the driver seat of an automobile having an integral seat and headrest and an inflatable pressure controlled bladder with the bladder in the normal, uninflated condition. FIG. 10B is a view as in FIG. 10A with the bladder expanded in the head contact position as would happen in anticipation of, e.g., a rear crash.

The seat containing the bladder system of this embodiment of the invention is shown generally at 465. The seat 465 contains an integral bladder 466 arranged within the cover of the seat 465, a fluid-containing chamber 467 connected to the bladder 466 and a small igniter assembly 468, which contains a small amount, such as about 5 grams, of a propellant such as boron potassium nitrate. Upon receiving a signal that a crash is imminent, igniter assembly 468 is ignited and supplies a small quantity of hot propellant gas into chamber 467. The gas (the fluid in a preferred embodiment) in chamber 467 then expands due to the introduction of the high temperature gas and causes the bladder 466 to expand to the condition shown in FIG. 10B. Bladder 466 expands in such a manner (through its design, construction and/or positioning and/or through the design and construction of the seat 465) as to conform to the shape of the occupant's head 33 and neck 460. As soon as the expanding headrest portion 469 of the seat 465 contacts the head 33 and neck 460 of the occupant (as may be determined by a contact sensor in the seat 465), pressure begins to increase in the bladder 466 causing a control valve 470 to open and release gas into the passenger compartment to thereby prevent the occupant from being displaced toward the front of the vehicle.

Control valve 470 is situated in a flow line between the bladder 466 and an opening in the rear of the seat 465 in the illustrated embodiment, but may be directly connected to the bladder 466. The flow line may be directed to another location, e.g., the exterior of the vehicle, through appropriate conduits. Control valve 470 can be controlled by an appropriate control device, such as the central diagnostic module, and the amount of gas released coordinated with or based on the severity of the crash or any other parameter of the crash or deployment of the airbag.

In the examples of FIGS. 10A and 10B, a small pyrotechnic element is utilized as the igniter assembly 468; however, the system itself is automatically resetable. Thus, after the impact, the system returns to its pre-inflated position and the only part that needs to be replaced is the igniter assembly 468. The cost of restoring the system after an accident is therefore small. The igniter assembly 468 may be positioned so that it can be readily accessed from the rear of the seat, e.g., by removing a panel in the rear of the seat. The igniter assembly 468 may be coupled directly or indirectly to a crash sensor, possibly through a central diagnostic module of the vehicle. The crash sensor is preferably an anticipatory crash sensor arranged so as to detect rear impacts because whiplash injuries are mostly caused during rear impacts.

In operation, the crash sensor, such as the anticipatory crash sensor of FIG. 2, detects the impending crash into the rear of the vehicle and generates a signal or causes a signal to be generated indicative of the fact that the igniter assembly 468 should be activated to inflate the bladder 466. The igniter assembly 468 is then activated generating heated gas which is directed into chamber 467. The gas in chamber 467 expands and passes through one or more conduits into the bladder 466 causing the bladder 466 to expand to the condition shown in FIG. 10B. The expanding bladder 466 will fill in the space between the occupant and the headrest and seat as shown in FIG. 10B. The bladder 466 may be designed to have more expansion capability in the head and neck areas as those surfaces will initially be further from the body of the driver. The inflated bladder 466 will thus reduce the risk of whiplash injuries to the driver.

The control valve 470 is designed or controlled to ensure that the bladder 466 expands sufficiently to provide whiplash protection without exerting a forward force of the driver. For example, the pressure in the bladder 466 may be measured during inflation and once it reaches an optimum level, the control (or pressure release) valve 470 may be activated. In the alternative, during the design phase, the time it takes for the bladder 466 to inflate to the optimum level may be computed and then the control valve 470 designed to activate after this predetermined time.

Instead of a control valve, it is also possible to use a variable outflow port or vent as described in the current assignee's US05748473, incorporated by reference herein.

After inflation and the crash, the igniter assembly 468 can be removed and replaced with compatible igniter assembly so that the vehicle is ready for subsequent use.

As shown in FIGS. 10A and 10B, the bladder 466 is integral with the seat 465 and the headrest of the seat is formed with the backrest as a combined seat back portion. If the headrest is formed separate from the backrest, then the bladder 466 can be formed integral with the headrest and if necessary, integral with the backrest to achieve the whiplash protection sought by the invention.

FIG. 11A is a side view of an occupant seated in the driver seat of an automobile having an integral seat and a pivotable or rotatable headrest and bladder with the headrest in the normal position. FIG. 1B is a view as in FIG. 1A with the headrest pivoted in the head contact position as would happen in anticipation of, e.g., a rear crash. In contrast to the embodiment of FIGS. 10A and 10B, this embodiment is purely passive in that no pyrotechnics are used.

Figure 11B:
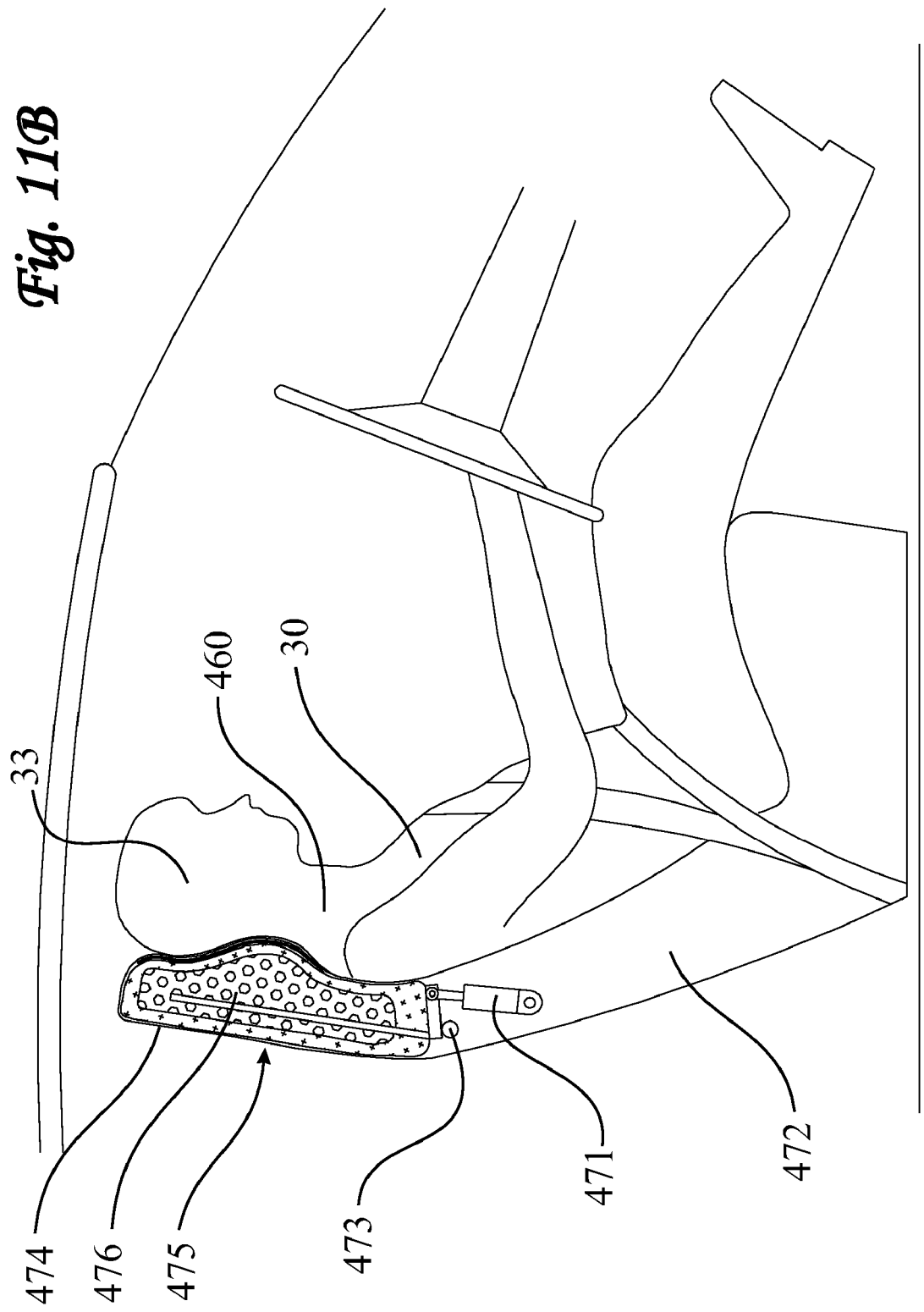
FIG. 11B is a view as in FIG. 10A with the headrest pivoted in the head contact position as would happen in anticipation of, e.g., a rear crash.

In this embodiment, upon receiving a signal that a crash is imminent, electronic circuitry, not shown, activates solenoid 471 causing headrest portion 474 to rotate about pivot 473 (an axis, pin, etc) toward the occupant. The system is shown generally at 475 and comprises a seat back portion 472 and headrest portion 474. In FIG. 11B, the headrest portion 474 has rotated until it contacts the occupant and then a bladder or airbag 476 within headrest portion 464 changes shape or deforms to conform to the head 33 and neck 460 of the occupant thereby supporting both the head and neck and preventing a whiplash injury. The control of the rotation of the headrest portion 474 can be accomplished either by a contact switch or force measurement using a switch or force sensor in the headrest or a force or torque sensor at the solenoid 471 or, alternately, by measuring the pressure within the airbag 476. Solenoid 471 can be replaced by another linear actuator such as an air cylinder with an appropriate source of air pressure.

The electronic circuitry, not shown, may be controlled by the central diagnostic module or upon receiving a signal from the crash sensor. Airbag 476 is shown arranged within the headrest portion 464, i.e., it is within the periphery of the surface layer of the headrest portion 474 and seat 475.

In operation, the crash sensor detects the impending crash, e.g., into the rear of the vehicle, and generates a signal or causes a signal to be generated resulting in pivotal movement of the headrest portion 474. The headrest portion 474 is moved (pivoted) preferably until a point at which the front of the headrest portion 474 touches the back of the driver's head. This can all occur prior to the actual crash. Thereafter, upon the crash, the driver will be forced backwards against the pivoted headrest portion 474. Gas will flow from the upper part of the headrest portion 474 and the seat back and thereby distribute the load between the head, neck and body.

As shown in FIGS. 11A and 11B, the headrest portion of the seat is formed with the backrest as a combined seat back portion. If the headrest is formed separate from the backrest, then the airbag 476 can be formed integral with the headrest and if necessary, integral with the backrest to achieve the whiplash protection sought by the invention. In this case, the pivot 473 might be formed in the backrest or between the backrest and headrest.

Although shown for use with a driver, the same systems could be used for passengers in the vehicle as well, i.e., it could be used for the front-seat passenger(s) and any rear-seated passengers. Also, although whiplash injuries are most problematic in rear impacts, the same system could be used for side impacts as well as front impacts and rollovers with varying degrees of usefulness.

Thus, disclosed herein is a seat for a vehicle for protecting an occupant of the seat in a crash which comprises a headrest portion, an expandable bladder arranged at least partially in the headrest portion, the bladder being arranged to conform to the shape of a neck and head of the occupant upon expansion, and an igniter for causing expansion of the bladder upon receiving a signal that protection for the occupant is desired. The bladder may also be arranged in least partially in the backrest portion of the seat. A fluid-containing chamber is coupled to the igniter and in flow communication with the bladder whereby the igniter causes fluid in the chamber to expand and flow into the bladder to expand the bladder. A control valve is associated with the bladder for enabling the release of fluid from the bladder. The bladder is preferably arranged in an interior of the headrest portion, i.e., such that its expansion is wholly within the outer surface layer of the headrest portion of the seat. A vehicle including this system can also include a crash sensor system for determining that a crash requiring protection for the occupant is desired. The crash sensor system generates a signal and directing the signal to the igniter. The crash sensor system may be arranged to detect a rear impact.

Another seat for a vehicle for protecting an occupant of the seat in a crash disclosed above comprises a backrest including a backrest portion and a headrest portion and an airbag arranged at least partially in the headrest portion. The headrest portion is pivotable with respect to the backrest portion toward the occupant. To this end, a pivot structure is provided for enabling pivotal movement of the headrest portion relative to the backrest portion. The pivot structure may be a solenoid arranged to move an arm about a pivot axis, which arm is coupled to the headrest portion. The airbag is arranged in an interior of the headrest portion of the backrest. A vehicle including this system can also include a crash sensor system for determining that a crash requiring protection for the occupant is desired. The headrest portion is pivoted into contact with the occupant upon a determination by the crash sensor system that a crash requiring protection for the occupant is desired. The crash sensor system may be arranged to detect a rear impact.

Also disclosed herein is a headrest for a seat which comprises a frame attachable to the seat and a fluid-containing bag attached to the frame. The bag is structured and arranged to allow movement of the fluid within the bag to thereby alter the shape of the bag and enable the bag to conform to the head and neck of an occupant. A deformable cover may substantially surround the bag such that the bag is within the seat, i.e., an outer surface of the bag is not exposed to the atmosphere. The cover is elastically deformable in response to changes in pressure in the bag. The frame may be made of a rigid material. The bag can contain cell foam having openings (open cell foam), which in a static state, determines the shape of the bag. The fluid in the bag may be air, i.e., an airbag. To provide the elastic deformation of the cover, the cover may include stretch seams at one or more locations. Preferably, the stretch seams should be placed on the side(s) of the headrest which will contour to the shape of the occupant's head and neck upon impact. The bag may include a constraining mechanism for constraining flow of fluid from an upper portion of the headrest to a lower portion of the headrest. The constraining mechanism may comprise open cell foam possibly with channels extending in a direction from a top of the headrest to a bottom of the headrest. In the alternative, the properties of the foam may be controlled to get the desired flow rate and possibly flow direction.

The constraining mechanism is structured and arranged such that when the upper portion contracts, the lower portion expands. Also, the constraining mechanism may be designed so that when the upper portion expands, the lower portion contracts. The cover and bag are structured and arranged such that when an occupant impacts the headrest, fluid within the bag flows substantially within the bag to change the shape of the bag so as to approximately conform to the head and neck of the occupant thereby providing a force on the head and neck of the occupant to substantially accelerate both the head and neck at substantially the same acceleration in order to minimize whiplash injuries. The bag preferably includes a flow restriction which permits a controlled flow of fluid out of the bag upon impact of an object with the headrest to thereby dampen the impact of the object with the headrest.

An inventive seat comprises a seat frame, a bottom cushion, a back cushion cooperating to support an occupant and a headrest attached to the seat frame. The headrest is as in any of the embodiments described immediately above.

An inventive cushioning arrangement for protecting an occupant in a crash comprises a frame coupled to the vehicle and a fluid-containing bag attached to the frame. The bag is structured and arranged to allow movement of the fluid within the bag to thereby alter the shape of the bag and enable the bag to conform to a portion of the occupant engaging the cushioning arrangement. The cushioning arrangement should be arranged relative to the occupant such that the bag impacts the occupant during the crash. As used here (and often elsewhere in this application), "impact" does not necessarily imply direct contact between the occupant and the bag but rather may be considered the exertion of pressure against the bag caused by contact of the occupant with the outer surface of the cushioning arrangement which is transmitted to the bag. The cushioning arrangement can also include a deformable cover substantially surrounding the bag. The cover is elastically deformable in response to changes in pressure in the bag. The frame may be coupled to a seat of the vehicle and extends upward from a top of the seat such that the cushioning arrangement constitutes a headrest. In the alternative, the cushioning arrangement can be used anywhere in a vehicle in a position in which the occupant will potentially impact it during the crash. The bag and headrest may be as in any of the embodiments described above.

An inventive protection system for protecting an occupant in a crash comprises an anticipatory crash sensor for determining that a crash involving the vehicle is about to occur, and a movable cushioning arrangement coupled to the anticipatory crash sensor. The cushioning arrangement is movable toward a likely position of the occupant, preferably in actual contact with the occupant, upon a determination by the anticipatory crash sensor that a crash involving the vehicle is about to occur. The cushioning arrangement comprises a frame coupled to the vehicle, and a fluid-containing bag attached to the frame. The bag is structured and arranged to allow movement of the fluid within the bag to thereby alter the shape of the bag and enable the bag to conform to the occupant. The cushioning arrangement and its parts may be as described in any of the embodiments above. The anticipatory crash sensor may be arranged to determine that the crash involving the vehicle is a rear impact. In this case, it could comprise a transmitter/receiver arrangement mounted at the rear of the vehicle. To provide for movement of the cushioning arrangement, a displacement mechanism is provided, e.g., a system of servo-motors, screws and support rods, and a control unit is coupled to the anticipatory crash sensor and the displacement mechanism. The control unit controls the displacement mechanism to move the cushioning arrangement based on the determination by the anticipatory crash sensor that a crash involving the vehicle is about to occur.

One disclosed method for protecting an occupant in an impact comprises determining that a crash involving the vehicle is about to occur, and moving a cushioning arrangement into contact with the occupant upon a determination that a crash involving the vehicle is about to occur. The cushioning arrangement comprises a frame coupled to the vehicle and a fluid-containing bag attached directly or indirectly to the frame. The bag is structured and arranged to allow movement of the fluid within the bag to thereby alter the shape of the bag and enable the bag to conform to the occupant. The cushioning arrangement may be as in any of the embodiments described above. The step of moving the cushioning arrangement into contact with the occupant may comprise moving the cushioning arrangement toward the occupant, detecting when the cushioning arrangement comes into contact with the occupant and then ceasing movement of the cushioning arrangement. The step of detecting when the cushioning arrangement comes into contact with the occupant may comprise arranging a contact switch in connection with the cushioning arrangement.

Also disclosed herein is a headrest and headrest positioning system which reduce whiplash injuries from rear impacts by properly positioning the headrest behind the occupant's head either continuously, or just prior to and in anticipation of, the vehicle impact and then properly supports both the head and neck. Sensors determine the location of the occupant's head and motors move the headrest both up and down and forward and back as needed. In one implementation, the headrest is continuously adjusted to maintain a proper orientation of the headrest to the rear of the occupant's head. In another implementation, an anticipatory crash sensor, such as described in commonly owned US06343810, is used to predict that a rear impact is about to occur, in which event, the headrest is moved proximate to the occupant.

Also disclosed herein is an apparatus for determining the location of the head of the occupant in the presence of objects which obscure the head. Such an apparatus comprises a transmitter for illuminating a selective portion of the occupant and the head-obscuring objects in the vicinity of the head, a sensor system for receiving illumination reflected from or modified by the occupant and the head-obscuring objects and generating a signal representative of the distance from the sensor system to the illuminated portion of the occupant and the head-obscuring objects, a selective portion changing system for changing the illuminated portion of the occupant and the head-obscuring objects which is illuminated by the transmitter and a processor. The processor is designed to sequentially operate the selective portion changing system so as to illuminate different portions of the occupant and the head-obscuring objects, and a pattern recognition system for determining the location of the head from the signals representative of the distance from the sensor system to the different selective portions of the occupant and the head-obscuring objects. The pattern recognition system may comprise a neural network. In some embodiments of the invention, the head-obscuring objects comprise items from the class containing clothing and hair. The pattern recognition system may be arranged to determine the location of the approximate longitudinal location of the head from the headrest. If one or more airbags is mounted within the vehicle, the head location system may be designed to determine the location of the head relative to the airbag. The transmitter may comprise an ultrasonic transmitter arranged in the headrest and the sensor system may also be arranged in the headrest, possibly vertically spaced from the transmitter. In the alternative, the transmitter and sensor system may comprise a single transducer. The selective portion changing system may comprise a control module coupled to the transmitter and the sensor system and servomotors for adjusting the position of the headrest.

Illumination as used herein is any form of radiation which is introduced into a volume of which contains the head of an occupant and includes, but it is not limited to, electromagnetic radiation from below one kHz to above ultraviolet optical radiation ($10^{16}$ Hz) and ultrasonic radiation. Thus, any system, such as a capacitive system, which uses a varying electromagnetic field, or equivalently electromagnetic waves, is meant to be included by the term illumination as used herein. By reflected radiation, it is meant the radiation that is sensed by the device that comes from the volume occupied by the head, or other part, of an occupant and indicates the presence of that part of the occupant. Examples of such systems are ultrasonic transmitters and receivers placed in the headrest of the vehicle seat, capacitive sensors placed in the headrest or other appropriate location (or a combination of locations such as one plate of the capacitor being placed in the vehicle seat and the other in the headliner), radar, far or near frequency infrared, visible light, ultraviolet, etc.

All of the above-described methods and apparatus may be used in conjunction with one another and in combination with the methods and apparatus for optimizing the driving conditions for the occupants of the vehicle described herein.

Thus there is disclosed and illustrated herein a passive rear impact protection system which requires no action by the occupant and yet protects the occupant from whiplash injuries caused by rear impacts.

Although several preferred embodiments are illustrated and described above, there are possible combinations using other geometries, sensors, materials and different dimensions for the components that perform the same functions. Therefore, this invention is not limited to the above embodiments and should be determined by the following claims. In particular, although the particular rear impact occupant protection system described in detail above requires all of the improvements described herein to meet the goals and objectives of this invention, some of these improvements may not be used in some applications. There are also numerous additional applications in addition to those described above. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention which is limited only by the following claims.

I claim:

1. A vehicle including a system for preventing injury to an occupant's head and neck during a rear impact, comprising:

an anticipatory crash sensor which predicts a rear impact prior to impact of an object into a rear of the vehicle to cause the rear impact;

a support structure which supports the occupant including an upper body support portion which supports the occupant's head and neck, said support structure having a plurality of different positions selectable by the occupant, said upper body support portion having an outer surface facing a rear of the occupant's head and neck and which is adapted to come into contact with the occupant's head and/or neck; and a positioning system coupled to said anticipatory crash sensor and arranged to adjust the position of said upper body support portion after prediction of the rear impact by said anticipatory crash sensor and before the rear impact such that said outer surface of said upper body support portion is closer to the occupant's head and neck during the rear impact to thereby reduce the distance between the rear of the occupant's head and neck and said outer surface of said upper body support portion, said positioning system adjusting the position of said upper body support portion by moving said upper body support portion in a direction toward the rear of the occupant's head and/or neck while also moving said upper body support portion in its entirety relative to a remaining part of said support structure.

2. The vehicle of claim 1, wherein said positioning system is arranged to adjust the position of said upper body support portion based on a position of the occupant's head and/or neck.

3. The vehicle of claim 1, wherein said support structure comprises a seat having a seat back portion, said upper body support portion comprising a headrest movable relative to said seat back portion, said outer surface of said upper body support portion being situated on said headrest.

4. The vehicle of claim 3, wherein said headrest is resettable and does not undergo permanent damage during the rear impact.

5. The vehicle of claim 1, wherein said upper body support portion is arranged to simultaneously support both the occupant's head and neck.

6. The vehicle of claim 1, further comprising a position determining system which determines the position of the occupant's head and/or neck, said positioning system being arranged to adjust the position of said upper body support portion after the prediction of the rear impact based on the position of the occupant's head and/or neck as determined by said position determining system.

7. The vehicle of claim 1, further comprising a control module coupled to said anticipatory crash sensor and said positioning system and arranged to control said positioning system to adjust the position of said upper body support portion upon prediction of the rear impact by said anticipatory crash sensor such that said support structure is in a different position during the rear impact than before the rear impact.

8. The vehicle of claim 1, wherein said positioning system is activatable such that upon activation of said positioning system, said upper body support portion is moved closer to the occupant's head and neck during the rear impact.

9. The vehicle of claim 8, further comprising a position determining system which determines the position of the occupant's head and/or neck, said positioning system being activated to adjust the position of said upper body support portion based on the position of the occupant's head and/or neck as determined by said position determining system prior to the rear impact.

10. A vehicle including a system for preventing injury to an occupant's head and neck during a rear impact, comprising:
an anticipatory crash sensor which predicts the rear impact prior to impact of an object into a rear of the vehicle to cause the rear impact;
a support structure which supports the occupant including an upper body support portion which supports the occupant's head and neck, said support structure having a plurality of different positions selectable by the occupant, said upper body support portion having an outer surface facing a rear of the occupant's head and neck and which is adapted to come into contact with the occupant's head and/or neck; and
a positioning system coupled to said anticipatory crash sensor and arranged to adjust the position of said upper body support portion before the rear impact from a first position in which said outer surface of said upper body support portion is apart from the occupant's head and neck to a second position in which said outer surface of said upper body support portion is closer to the occupant's head and neck, said positioning system being activated to adjust said upper body support portion to the second position after prediction of the rear impact by said anticipatory crash sensor to thereby reduce the distance between the rear of the occupant's head and neck and said outer surface of said upper body support portion,
said positioning system adjusting the position of said upper body support portion by moving said upper body support portion in a direction toward the rear of the occupant's head and/or neck while also moving said upper body support portion in its entirety relative to a remaining part of said support structure.

11. The vehicle of claim 10, wherein said support structure comprises a seat having a seat back portion, said upper body support portion comprising a headrest movable relative to said seat back portion, said outer surface of said upper body support portion being situated on said headrest.

12. The vehicle of claim 11, wherein said headrest is resettable and does not undergo permanent damage during the rear impact.

13. The vehicle of claim 10, wherein said upper body support portion is arranged to simultaneously support both the occupant's head and neck.

14. The vehicle of claim 10, further comprising a position determining system which determines the position of the occupant's head and/or neck, said positioning system being arranged to adjust the position of said upper body support portion after the prediction of the rear impact based on the position of the occupant's head and/or neck as determined by said position determining system.

15. The vehicle of claim 10, further comprising a control module coupled to said anticipatory crash sensor and said positioning system and arranged to control said positioning system to adjust the position of said upper body support portion upon the prediction of the rear impact by said crash sensor such that said support structure is in a different position during the rear impact than before the rear impact.

16. A method for preventing injury to a vehicular occupant's head and neck during a rear impact involving the vehicle, comprising:
enabling the occupant to selectively adjust a support structure which is designed to support the occupant's head and neck into one of a plurality of different positions, the support structure including an upper body support portion having an outer surface facing a rear of the occupant's head and neck and which is adapted to come into contact with the occupant's head and/or neck;
predicting the rear impact prior to impact of an object into a rear of the vehicle to cause the rear impact;
determining that the occupant's head and/or neck require support for the rear impact; and
adjusting the position of the support structure after prediction of the rear impact and before the rear impact such that the outer surface of the upper body support portion of the support structure is closer to the occupant's head and neck during the rear impact whereby motion of the occupant's head and neck relative to the occupant's back is thereby reduced during the rear impact,
the step of adjusting the position of the support structure comprising moving the upper body support portion in a direction toward the rear of the occupant's head and/or neck while also moving the upper body support portion in its entirety relative to a remaining part of the support structure.

17. The method of claim 16, further comprising determining the position of the occupant's head and/or neck prior to the rear impact, the position of the support structure being adjusted after the prediction of the rear impact based on a position of the occupant's head and/or neck.

18. The method of claim 16, wherein the support structure comprises a seat having a seat back portion, the upper body support portion comprising a headrest movable relative to seat back portion, the outer surface of the upper body support portion being formed on the headrest.

19. The method of claim 16, wherein the step of adjusting the support structure comprises moving the support structure from a first position in which the upper body support portion is apart from the occupant's head and neck to a second position in which the upper body support portion is closer to the occupant's head and neck, further comprising moving the upper body support portion back to the first position after the rear impact.

20. The method of claim 16, further comprising constructing the upper body support portion to prevent permanent damage thereto during the rear impact.

21. The vehicle of claim 1, wherein said positioning system is arranged to adjust the position of said upper body support portion after the prediction of the rear impact such that said upper body support portion is in contact with the occupant's head and neck during the rear impact whereby motion of the occupant's head and neck relative to the occupant's back is substantially eliminated during the rear impact.

22. The vehicle of claim 1, wherein said positioning system is arranged to adjust the position of said upper body support portion relative to the remaining part of said support structure such that said outer surface of said upper body support portion is moved closer to the occupant's head and neck prior to the rear impact.

23. The vehicle of claim 1, wherein said positioning system is arranged to, after the rear impact, adjust the position of said upper body support portion by moving said upper body support portion in a direction away from the rear of the occupant's head and/or neck while also moving said upper body support portion in its entirety relative to the remaining part of said support structure.

24. The vehicle of claim 3, wherein said positioning system is arranged to adjust the position of said headrest in its entirety relative to said seat back portion prior to the rear impact such that said outer surface of said headrest is moved closer to the occupant's head and neck after the prediction of the rear impact.

25. The vehicle of claim 9, wherein said position determining system is arranged on said upper body support portion.

26. The vehicle of claim 10, wherein said positioning system is arranged to adjust the position of said upper body support portion from a first position in which said upper body support portion is apart from the occupant's head and neck to a second position in which the upper body support portion is in contact with the occupant's head and neck.

27. The vehicle of claim 14, wherein said position determining system is arranged on said upper body support portion.

28. The method of claim 16, wherein the position of the support structure is adjusted prior to the rear impact such that an upper body support portion of the support structure is in contact with the occupant's head and neck during the rear impact whereby motion of the occupant's head and neck relative to the occupant's back is thereby substantially eliminated during the rear impact.

29. The method of claim 16, wherein the step of adjusting the support structure comprises moving the support structure from a first position in which the upper body support portion is apart from the occupant's head and neck to a second position in which the upper body support portion is in contact with the occupant's head and neck, further comprising moving the upper body support portion back to the first position after the rear impact.

30. The vehicle of claim 10, wherein said positioning system is arranged to, after the rear impact, adjust the position of said upper body support portion by moving said upper body support portion in a direction away from the rear of the occupant's head and/or neck while also moving said upper body support portion in its entirety relative to the remaining part of said support structure.

31. The method of claim 16, further comprising:
after the rear impact, moving the upper body support portion in a direction away from the rear of the occupant's head and/or neck while also moving the upper body support portion in its entirety relative to the remaining part of the support structure.

32. The vehicle of claim 1, wherein said positioning system adjusts the position of said upper body support portion prior to movement of the occupant's head toward said outer surface of said support body support portion arising from the rear impact.

33. The vehicle of claim 10, wherein said positioning system adjusts the position of said upper body support portion prior to movement of the occupant's head toward said outer surface of said support body support portion arising from the rear impact.

34. The method of claim 16, wherein the position of the support structure is adjusted prior to movement of the occupant's head toward the outer surface of the support body support portion arising from the rear impact.

35. The vehicle of claim 1, wherein said support structure comprises a seat having a seat back portion, said upper body support portion consisting of a headrest movable relative to said seat back portion, said outer surface of said upper body support portion being situated on said headrest.

36. The vehicle of claim 10, wherein said support structure comprises a seat having a seat back portion, said upper body support portion consisting of a headrest movable relative to said seat back portion, said outer surface of said upper body support portion being situated on said headrest.

37. The method of claim 16, wherein the support structure comprises a seat having a seat back portion, the upper body support portion consisting of a headrest movable relative to seat back portion, the outer surface of the upper body support portion being formed on the headrest.

* * * * *

UNITED STATES PATENT AND TRADEMARK OFFICE
CERTIFICATE OF CORRECTION

PATENT NO.       : 7,604,080 B2
APPLICATION NO.  : 11/381001
DATED            : October 20, 2009
INVENTOR(S)      : David S. Breed It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 414 days.

Signed and Sealed this

Fifth Day of October, 2010

David J. Kappos
*Director of the United States Patent and Trademark Office*